United States Patent
Takada et al.

[11] Patent Number: 6,165,646
[45] Date of Patent: Dec. 26, 2000

[54] SOLID STATE RECHARGEABLE LITHIUM BATTERY, STACKING BATTERY, AND CHARGING METHOD OF SAME

[75] Inventors: Kazunori Takada, Osaka; Makoto Fujino, Moriguchi; Kazuya Iwamoto, Sakai; Shigeo Kondo, Hirakata, all of Japan

[73] Assignee: Matsushita Electric Industrial Co., Ltd., Osaka, Japan

[21] Appl. No.: 09/386,900

[22] Filed: Aug. 31, 1999

Related U.S. Application Data

[62] Division of application No. 08/925,136, Sep. 8, 1997.

[30] Foreign Application Priority Data

Sep. 13, 1996 [JP] Japan .................................. 8-242754

[51] Int. Cl.[7] .............................. H01M 6/18; H01M 4/58; H02J 7/00; H02J 7/06; H02J 7/16

[52] U.S. Cl. ................. 429/322; 429/231.95; 429/231.1; 429/231.3; 429/312; 429/313; 320/116; 320/119; 320/120; 320/151; 320/163

[58] Field of Search ..................................... 320/116, 119, 320/120, 151, 163; 429/231.95, 322, 231.1, 231.3, 312, 313

[56] References Cited

U.S. PATENT DOCUMENTS

| 5,395,711 | 3/1995 | Tahara et al. ............................ 429/197 |
| 5,500,291 | 3/1996 | Minami et al. . | |
| 5,677,081 | 10/1997 | Iwamoto et al. . | |
| 5,903,136 | 5/1999 | Takahashi et al. ....................... 320/128 |

*Primary Examiner*—Maria Nuzzolillo
*Assistant Examiner*—Angela J. Martin
*Attorney, Agent, or Firm*—Stevens, Davis, Miller & Mosher, L.L.P.

[57] ABSTRACT

A solid-state secondary lithium battery with excellent charge and discharge cycle characteristics, using a negative electrode active material which shows discontinuous change of potential caused by the lithium ion insertion and extraction reactions, wherein the amount of the lithium ion inserted, until discontinuous change of potential of the negative elctrode takes place, is equal to or smaller than the maximum amount of extraction of lithium ions within the range where lithium ions are inserted and extracted into or from the lithium transition metal oxide reversibly, and a battery assembly using these batteries.

33 Claims, 5 Drawing Sheets

(a)

(b)

(a)

(b)

SOLID STATE RECHARGEABLE LITHIUM BATTERY, STACKING BATTERY, AND CHARGING METHOD OF SAME

This is a division of application Ser. No. 08/925,136, filed Sep. 8, 1997.

FIELD OF THE INVENTION

The present invention relates to a solid-state (secondary) lithium battery (rechargeable lithium battery) using a lithium ion conductive solid electrolyte, a battery assembly (a stacking battery), and a method for charging these batteries.

BACKGROUND OF THE INVENTION

Development of portable electric and electronic devices such as, typically, personal computers and handy-phones in recent years has provoked a phenomenal increase of demand for batteries used as power source of these devices. Especially lithium batteries have been studied intensively in expectation of obtaining a battery capable of providing a high energy density as lithium has small atomic weight and high ionization energy, and such lithium batteries have now come to be used popularly as a power source of the various portable electric and electronic devices and for various other purposes.

On the other hand, with such prevalence of lithium batteries, increasing concern has been shown recently on safety of the batteries in practical use thereof, in view of the enlargement of inherent energy due to the increasing amount of the active material contained in the battery and the increase of the content of the organic solvent which is an inflammable material used for the electrolyte. Use of a solid electrolyte, which is an nonflammable material, in place of the conventional organic solvent electrolytes is very effective for securing safety of the lithium batteries, and the development of a solid-state lithium battery with high safety feature has been required.

For obtaining a high-voltage battery, a specific material such as lithium cobalt oxide ($Li_{1-x}CoO_2$) is used as the active material for the positive electrode of a lithium battery. This material is of a metastable phase that can be formed as a result of extraction of lithium ions from $LiCoO_2$, which is a high temperature stable phase. $LiCoO_2$ has a structure in which the respective triangular lattices of oxygen, lithium and cobalt are accumulated in the order of O—Li—O—Co—O—Li—O, with lithium ions present between the $CoO_2$ layers. Said material can serve as an electrode material of a lithium battery as reversible insertion and extraction of lithium ions take place between said layers.

The lithium ions in $LiCoO_2$ play the role of having the $CoO_2$ layers attracted to each other by virtue electrostatic attraction between the cationic lithium atoms and anionic oxygen atoms. When the lithium ions are extraction from $LiCoO_2$, since there no longer exists Li in the O—Li—O structure, electrostatic repulsive force between the oxygen atoms in the $CoO_2$ layers elevates to cause an interlaminar stretch. Consequently, there takes place expansion or shrinkage of the crystal lattices due to the lithium ion insertion/extraction reactions during charging or discharging of the lithium battery.

The interface between the electrode active material and the electrolyte in a solid-state battery using a solid electrolyte is a solid/solid interface which, as compared with the solid/liquid interface in the conventional liquid electrolyte batteries, has greater difficulties in enlarging the contact area between the electrode active material and the electrolyte, namely the the electrochemaical reaction interface. Further, in case a material which undergoes a volumetric change during charging or discharging, such as the afore-mentioned lithium cobalt oxides, is used as the electrode active material, it is difficult to keep a steady interface between such electrode active material and the solid electrolyte. Consequently, the interface is always subject to change during operation of the battery, and the change of the interface causes a corresponding change of overvoltage in the electrode reaction.

Charging of a battery can be effected by either a constant-current charging method or a constant-voltage charging method. In the case of the constant-current charging method, charging is terminated when the terminal voltage of the battery has reached a certain value, so that it is necessary to set the charging voltage of the battery no matter which method is used.

However, as explained above, the overvoltage of the reaction changes incessantly at the electrode of a solid-state battery, so that the electrode potential on during charging is not constant even in case the terminal voltage of the battery is kept constant during charging. This means that the battery may be charged deeply in case the reaction overvoltage decreases even though charging is performed at a constant voltage.

$Li_{1-x}CoO_2$ formed by extraction of lithium ions from $LiCoO_2$ shows a high equilibrium potential of 4 V Vs Li or above, but the crystal structure becomes unstable due to the afore-mentioned repulsion force between the oxygen atoms. Therefore, in order to effect stabilized operation of a battery using said material as the electrode active material, it is necessary to limit the maximum amount of extraction lithium ions within a reversible range. Excessive elimination of lithium ions causes a change of crystal structure, making it unable to show the reversible insertion/extraction reactions of lithium ions. Therefore, in a charge and discharge cycle of a solid-state lithium secondary battery using said material as the electrode active material, when there takes place a decrease in overvoltage such as mentioned above and the battery is charged deeply, extraction amount of lithium ions exceeds the limit of reversible range, resulting in deterioration of the insertion/extraction reactions of lithium ions between the crystal layers. This leads to a decrease of battery capacity with the charge and discharge cycle of the battery, giving rise to the problem of reduced charge and discharge cycle life of the battery.

Said phenomenon of deep charging of the battery is also caused by inaccuracy of charging control of the charger or drift of charging voltage with time. Therefore, precise charging control is essential for elongating the cycle life of the battery. This is, however, hardly achievable by use of an uncostly charger, giving rise to the problem of necessity of using a costly charger.

The foregoing explanation concerns the case where $LiCoO_2$ was used as the positive electrode active material, but similar problems may arise even in the case of a solid-state lithium secondary battery using other materials such as $Li_{1-x}NiO_2$ and $Li_{1-x}Mn_2O_4$ as the positive electrode active material since these materials also show an equilibrium potential exceeding 4 V when taking a metastable phase.

There are other factors, such as volumetric change of the electrode active material consequent to charging or discharging, which greatly affect the cycle characteristics of a solid-state battery. Generally, a solid-state battery is composed of solid particles, and these solid particles become plastic on occurrence of displacements such as expansion or contraction in case no force is acting in the direction of causing aggregation of the particles. Therefore, in a non-pressurized solid-state battery, there are formed the voids among the consisting solid particles therearound due to expansion or contraction of the electrode active material caused by charging or discharging. This is causative of a decrease of the electrochemical reaction area after repetition of charge and discharge resulting in a reduction of current collectability of the electrode active material and degradation of battery performance.

The present invention is envisaged to solve the above problems and provide a solid-state lithium secondary battery with excellent charge and discharge cycle characteristics, a battery assembly, and a method for charging them.

SUMMARY OF THE INVENTION

The present invention relates to a solid-state (secondary) lithium battery comprising (a) an electrolyte layer mainly composed of a lithium ion conductive solid electrolyte, (b) a positive electrode containing a lithium transition metal oxide capable of inducing reversible electrochemical insertion and extraction reactions of lithium ions into or from lithium ion sites in the crystal structure, and (c) a negative electrode containing a material showing discontinuous change of potential consequent to the insertion and extraction reactions of lithium ions into or from the lithium ion sites in the crystal structure, the amount of the lithium ion inserted, until potential of the material showing discontinuous change of potential consequent to the inserting and extraction reactions of lithium ions discontinuously changes, being equal to or smaller than the maximum extracted amount of the lithium ions which is extracted by the reversible insertion and extraction reactions of the lithium transition metal oxide (the maximum amount of extraction of lithium ions within the range where lithium ions are reversibly inserted and extracted into or from the lithium transition metal oxide).

The present invention, further, relates to a battery assembly comprising plural electrically connected unit cells, which battery assembly has a structure of plural unit cells connected in series at a part of the battery assembly and a unit cells having at least the smallest capacity among the plural unit cells connected in series is the solid-state lithium secondary battery as mentioned above The present invention, further, relates to a method for charging the battery as mentioned above comprising the step of:

charging the battery showing discontinuous change of voltage from the voltage $V_1$ to the voltage $V_2$ relative to a charged quantity of electricity, at a voltage same as or less than the voltage $V_2$.

The present invention, further, relates to a (secondary) lithium battery in which an amorphous lithium ion conductive solid electrolyte mainly composed of a sulfide is used as electrolyte, and $Li_{4/3}Ti_{5/3}O_4$ is used as electrode active material.

Figure 1:
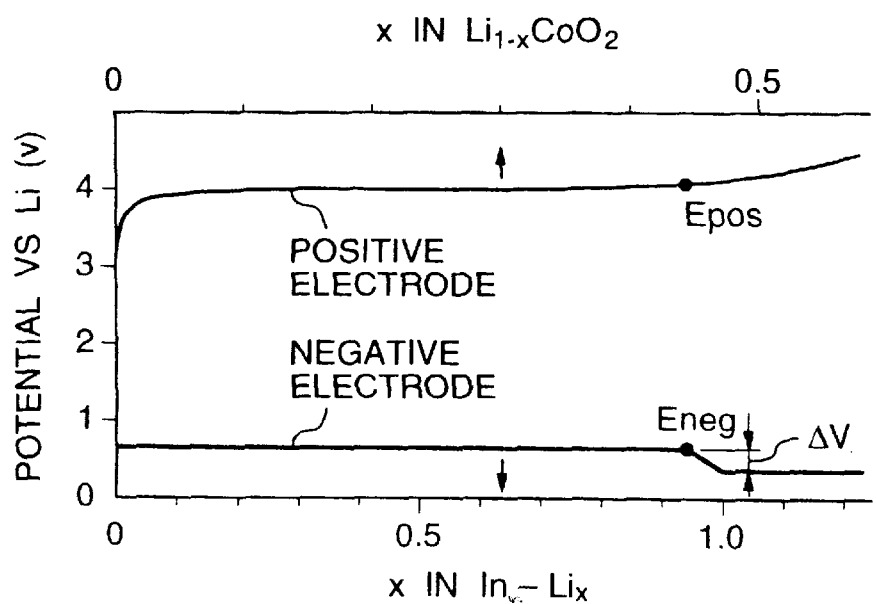
FIG. 1(a) is a diagram showing the change of the single-electrode potential of the positive and negative electrodes for illustrating the operational principle of the solid-state secondary lithium battery according to the present invention.
FIG. 1(b) is a diagram showing the change of electromotive force of the battery for illustrating the operational principle of the solid-state secondary lithium battery according to the present invention.
Figure 1:
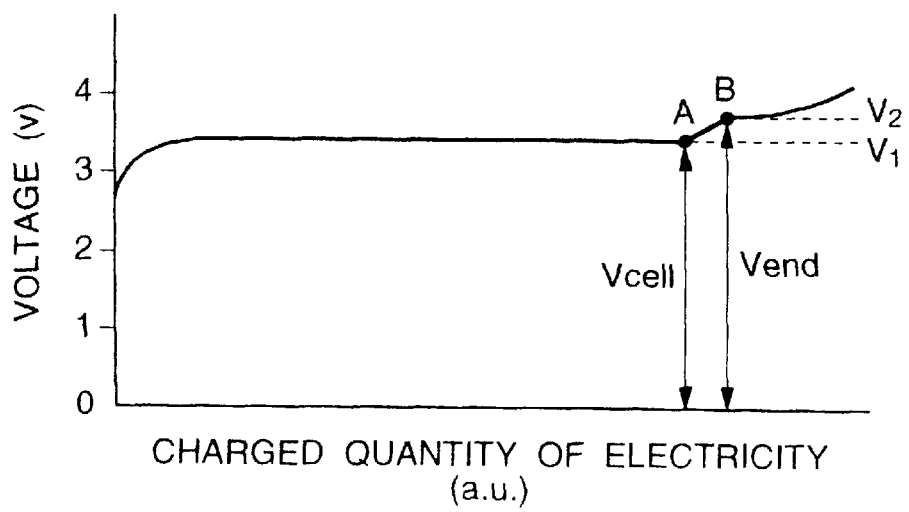

In the drawings, reference numerals designate the following:

1: positive electrode 2: solid electrolyte layer 3: negative electrode 4: battery container 5: gasket 6: cover 7: unit cell (i) 8: unit cell (ii) 9: connector 10: battery container 11: gasket 12: cover

DETAILED DESCRIPTION OF THE INVENTION

The term "reversible" used in electrochemistry sometimes means that the reaction rate is high. But, hereinafter, the "reversible insertion/extraction reactions" means that lithium ions can be inserted electrochemically to the lithium ion sites of the lithium transition metal oxides, from which once lithium ions were extracted electrochemically.

In the present invention, as the material showing discontinuous change of potential consequent to the insertion/extraction reaction of lithium ions into or from the lithium ion sites in the crystal structure, there can be used at least one metal selected from the group consisting of indium, aluminum, lead, bismuth, antimony, gallium, tin, silver, silicon, zinc, cadminum, arsenic and titanium, or an alloy of the metals selected from the above group, or an alloy of lithium and at least one metal selected from the above group.

In accordance with the present invention, a solid-state secondary lithium battery can be constructed by using indium as the material showing discontinuous change of potential consequent to the insertion/extraction reaction of lithium ions into or from the lithium ion sites in the crystal structure, and by specifying the lithium ion insertion and extraction such that the amount of the lithium ion inserted, until potential of the material showing discontinuous change of potential consequent to the insertion and extraction reactions of lithium ions discontinuously changes, is the amount corresponding to the following reaction formula (3):

$$In + Li^+ + e^- \rightarrow In-Li \qquad (3)$$

A solid-state secondary lithium battery can be also composed by using aluminum as the material showing discontinuous change of potential consequent to the insertion/extraction reactions of the lithium ions into or from the lithium ion sites in the crystal structure, and by specifying the lithium ion insertion and extraction such that the amount of the lithium ion inserted, until potential of the material showing discontinuous change of potential consequent to the insertion and extraction reactions of lithium ions discontinuously changes, is the amount corresponding to the following reaction formula (4):

$$Al + Li^+ + e^- \rightarrow Al-Li$$

Further, in the present invention, as the material showing discontinuous change of potential consequent to the insertion/extraction reactions of the lithium ions, there can be used a compound selected from the group consisting of transition metal oxides, lithium transition metal oxides, transition metal sulfides and lithium transition metal sulfides.

As the transition metal element of said transition metal oxides or lithium transition metal oxides, at least one element selected from the group consisting of titanium, manganese, tungsten and vanadium can be used.

As the transition metal element of said transition metal sulfides or lithium transition metal sulfides, at least one element selected from the group consisting of titanium, molybdenum, niobium, tungsten and vanadium can be used.

As the transition metal element of the lithium transition metal oxides used for the positive electrode, at least one element selected from the group consisting of cobalt, nickel, manganese and iron can be used.

As the lithium ion conductive solid electrolyte, an electrolyte comprising an inorganic compound can be used.

As said inorganic compound, a sulfide-based amorphous inorganic compound can be used. The compounds synthesized from the materials mainly composed of lithium sulfide or silicon sulfide can be also usable.

In the present invention, in another embodiment thereof, the above-described solid-state secondary lithium battery can be used as the unit cell having at least the smallest capacity in a plurality of series-connected unit cells in a battery assembly having a structure in which, at a part thereof, the plural unit cells are connected in series.

A plurality of unit cells can be housed in an airtight battery container to constitute a battery assembly.

In the present invention, these batteries showing discontinuous change of voltage from the voltage $V_1$ to the voltage $V_2$ with relation to the charged quantity of electricity can be charged at a voltage below $V_2$.

Also, in the present invention, an amorphous lithium ion conductive solid electrolyte mainly composed of a sulfide can be used as electrolyte, and $Li_{4/3}Ti_{5/3}O_4$ can be used as electrode active material.

An embodiment of the present invention is described below by taking the case of a solid-state secondary lithium battery using a lithium cobalt oxide as a positive electrode active material and an indium-lithium alloy as a negative electrode active material.

In a solid-state secondary lithium battery constituted by using a lithium ion conductive solid electrolye, a lithium cobalt oxide as positive electrode active material and indium as negative electrode active material, there take place a reaction of the following formula (5) at the positive electrode and a reaction of the following formula (6) at the negative electrode during charging. That is, lithium ions are extracted from the lithium cobalt oxide at the positive electrode while an indium-lithium alloy is formed by the lithium ions extracted from the positive electrode at the negative electrode.

$$LiCoO_2 \rightarrow Li_{1-x}CoO_2 + xLi^+ + xe^- \qquad (5)$$

$$In + xLi^+ + xe^- \rightarrow In-Li_x \qquad (6)$$

Here, the reversible insertion/extraction reaction of lithium ions into or from the lithium cobalt oxide can be effected in the range where $x \leq 0.5$, and the potential of the indium-lithium alloy changes discontinuously from about 0.6 V to about 0.4 V when x is about 1.0.

FIG. 1(a) is a diagram showing the change of single-electrode potential at the positve and negative electrodes during charging of a solid-state secondary lithium battery constructed by using as positive electrode active material a lithium cobalt oxide in an amount of 2.1 times molar quantity of indium used as negative electrode active material. The pattern of change of electromotive force of the battery is shown in FIG. 1(b). The maximum amount of extraction of lithium ions that can cause reversible insertion and extraction of lithium ions into or from the lithium cobalt oxide is an amount that provides the composition of $Li_{0.5}CoO_2$, while the amount of lithium ions loaded until discontinuous change of indium potential takes place is an amount that provides the composition of In—Li. Therefore, this solid-state secondary lithium battery is so constructed that amount of the lithiun ion inserted until discontinuous change of indium potential occurs will be substantially equal to or slightly smaller than the maximum amount of extraction of lithium ions that can cause reversible insertion and extraction of lithium ions into or from the lithium cobalt oxide.

FIG. 2(a) shows the pattern of change of electrode potential at the positive and negative electrodes during charging of a solid-state secondary lithium battery constructed by using as positive electrode active material a lithium cobalt oxide in an amount of 1.4 times molar quantity of indium used as negative electrode active material. The pattern of change of electromotive force of this battery is shown in FIG. 2(b). In this solid-state secondary lithium battery, amount of the lithium ion inserted until discontinuous change of indium potential occurs is greater than the maximum amount of extraction of lithium ions that causes reversible insertion and extraction of lithium ions into or from the lithium cobalt oxide.

Figure 2:
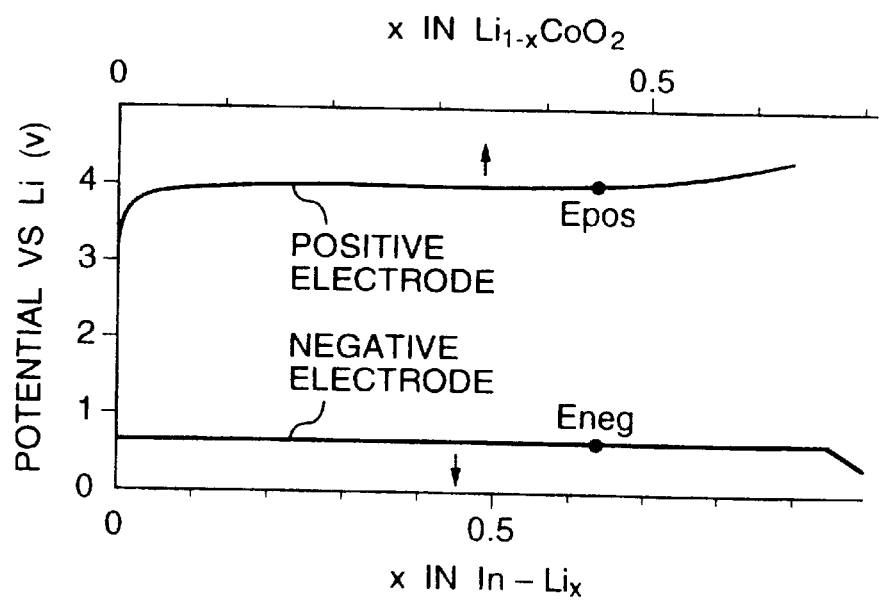
FIG. 2(a) is a diagram showing the change of the single-electrode potential of the positive and negative electrodes for illustrating the operational principle of the solid-state secondary lithium battery according to the comparative example.
FIG. 2(b) is a diagram showing the change of electromotive force of the battery for illustrating the operational principle of said comparative solid-state secondary lithium battery.
Figure 2:
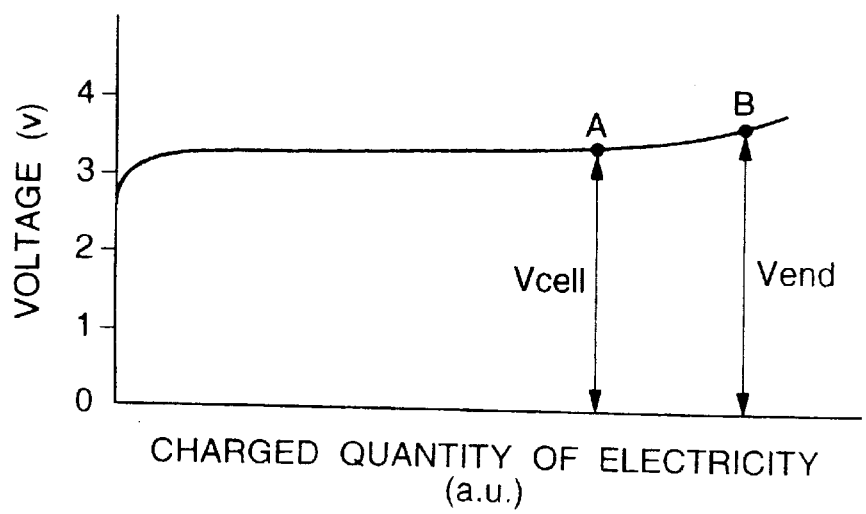

In these solid-state secondary lithium batteries, the maximum battery capacity is provided until the lithium cobalt oxide takes the composition of $Li_{0.5}CoO_2$, so that it should be possible to charge the battery completely up to the point A in FIGS. 1 and 2 by carrying out charging at a voltage (Vcell) corresponding to the difference (Epos–Eneg) between the positive electrode potential (Epos) and negtive electrode potential (Eneg) during the charging of the battery. Actually, however, in the battery being charged, there takes place DC polarization due to internal resistance or overvoltage ($\eta$) due to electrode reaction, and therefore it is not charged at the maximum battery capacity when charged at the voltage of Vcell, so that it is necessary to charge battery at a voltage (Vend) higher than Vcell for full charging of the battery.

However, the value of $\eta$ is not constant and tends to decrease in accordance with charging of the battery as explained below.

For instance, when charging is performed at a constant voltage, $\eta$ decreases with decreasing of the charging current near the end of charging.

Also, in case of using a lithium ion conductive solid electrolyte, there takes place a reduction of η with charging of the battery according to the following mechanism. At the positive electrode during charging, the distance between the $CoO_2$ layers of lithium cobalt oxide elongates and the volume of the positive electrode expands. Volume expansion also takes place at the negative electrode as metallic indium is converted to an indium-lithium alloy. Consequently, pressure to the battery element increases, which contributes to the improvement of contact between the solid particles constituting the battery and the reduction of polosity of the battery element. This leads to a reduction of internal resistance of the battery and a corresponding decrease of η.

Here, let us consider the case where η was made extremely small, that is, the case of η→0.

When η→0 near the end of charging where the charging voltage is Vend, the difference between the positive electrode potential and the negative electrode potential, viz. Epos–Eneg, approaches Vend. Consequently, the battery is charged deeply to the point B in FIG. 2, exceeding the point A to which charging is supposed to be effected. In this case, lithium ions are extracted from the lithium cobalt oxide until it takes the composition of $Li_{0.4}CoO_2$. This impairs reversibility of the lithium ion insertion/extraction reactions in the lithium cobalt oxide, resulting in deterioration of the charge/discharge cycle characteristics.

On the other hand, in the case of the construction of FIG. 1 according to the present invention, if the value of Vend–Vcell is smaller than the amount of discontinuous change (ΔV) of indium potential, the battery is only charged to the point B in the drawing even when η→0, and the amount of extraction of lithium ions from the lithium cobalt oxide remains in the range where reversible insertion and extraction can take place, even if charging is carried out at a voltage of Vend.

In case the above battery construction is adopted, even if the charger precision is low and the charging voltage elevates, if such variation is less than ΔV, the amount of the lithium ions extracted from the lithium cobalt oxide is also kept within the range where reversible reactions take place, and there occurs no deterioration of the battery performance.

According to the above-described mechanism and its operations, there can be obtained an excellent solid-state secondary lithium battery consisting of an electrolyte layer mainly composed of a lithium ion conductive solid electrolyte, a positive electrode containing a lithium transition metal oxide which shows the reversible electrochemical insertion and extraction reactions of lithium ions into or from the lithium ion site in the crystal structure, and a negative electrode containing a material which shows discontinuous change of potential consequent to said lithium ion insertion and extraction reactions, said solid-state secondary lithium battery being prominently improved in charge and discharge cycle characteristics owing to the structural feature that the amount of the lithium ion inserted until potential of the material showing discontinuous change of potential consequent to said lithium ion insertion and extraction reaction changes discontinuously is equal to or smaller than the maximum amount of extraction of lithium ions that causes reversible insertion and extraction reactions of lithium ions into or from said lithium transition metal oxide.

The battery of the above-described mechanism shows discontinuous change of voltage from $V_1$ to $V_2$ in relation to the charged quantity of electricity as shown in FIG. 1(b). In this battery, therefore, it is desirable that the charging voltage is set below $V_2$.

The above-described phenomenon of impairing the charge and discharge cycle characteristics by overcharging is also observed in the secondary lithium batteries using an organic electrolyte, however particularly in a solid-state secondary lithium battery using a solid electrolyte for the following reason.

The mechanism of impairment of charge and discharge cycle characteristics by deep charging can be accounted for by the fact that, as already stated, when the lithium ions are extracted from $LiCoO_2$, since Li no longer exists in the O—Li—O structure, the electro-static repulsive force between the oxygen atoms in the $CoO_2$ layer strengthens to unstabilize the crystal structure. In the electrolyte using an organic solvent, however, since the organic solvent molecules are also co-inserted between the $CoO_2$ layers, such organic solvent molecules are present between the layers even after the lithium ions have been extracted from between the $CoO_2$ layers. The anionic oxygen atoms in the $CoO_2$ layers induce a quadrupolar moment in the organic solvent molecules, and the oxygen atoms and the organic molecules are attracted each other. Consequently, the static repulsive force between the oxygen atoms decreases to diminish instability of the crystal structure. Because of the absence of such interaction in a solid-state secondary lithium battery, crystal instability is greater than when an organic electrolyte is used, so that degradation of cycling performance due to the deep charging is greater charcterisitcs by deep charging.

For the reasons stated above, the effect of the present invention is outstanding in a solid-state secondary lithium battery using a lithium ion conductive solid electrolyte.

The lithium ion conductive solid electrolytes may be divided into two groups: inorganic compounds and organic polymer compounds. Those mainly composed of an organic polymer compounds contain an organic solvent as plasticizer, and the molecules of this organic solvent contribute to the reduction of instability of the crystal structure. Therefore, the effect of the present invention is particularly remarkable in a solid-state secondary lithium battery using a lithium ion conductive solid electrolyte composed of inorganic compounds.

Further, by using a lithium ion conductive solid electrolyte of inorganic compounds and also having high ion conductivity, it is possible to improve high rate capability of the battery. Therefore, as the lithium ion conductive solid electrolyte an inorganic compound showing high ion conductivity, it is especially preferred to use the amorphous electrolytes mainly composed of sulfides. These electrolytes can be obtained by melting at a high temperature and then rapidly cooling a mixture of a sulfides for glass network forming and lithium sulfide for producing mobile lithium ions in the glass structure. Of these electrolytes, those synthesized from mainly of lithium sulfide or silicon sulfide are especially preferred because the vapor pressure of each component during synthesis is low and there is no need of sealing up the starting material for preventing evaporation loss of the components. It suits to a large scale of preparation of the electrolytes.

We have discussed the case of using indium or an indium-lithium alloy as the material showing discontinuous change of potential consequent to the insertion and extraction reaction of lithium ions into or from the lithium ion site in the crystal structure, but the following can be cited as other examples of the materials showing the similar action.

First, the metallic elements are discussed.

In the insertion reaction, represented by the following formula (7), of lithium ions into the lithium ion site in the metal represented by the elemental symbol Me, in case Me is aluminum, there takes place discontinuous change of potential from 0.35 V to around 0 V when x is about 1.0. This indicates that the same effect as described above can be obtained by using aluminum in place of indium discussed above.

$$Me + xLi^- + xe^- \rightarrow Me-Li_x \tag{7}$$

Similar discontinuous change of potential occurs when x=2.0 in case Me is lead or bismuth, when x=2.5 in case Me is antimony, and when x=1.0 in case Me is gallium or tin. Such discontinuous change of potential also occurs in the lithium ion insertion reaction in case Me is silver, silicon, zinc, cadminum, arsenic or titanium, so that the same effect can be obtained in case of using these materials.

In the case of a material showing plural discontinuous change of potential consequent to the lithium ion insertion/extraction reaction, the amount of the lithium ion inserted until discontinuous change of potential stated in claim 1 takes place may be of any amount that can cause any of said discontinuous changes of potential.

For instance, in case Me is tin in the formula (7), discontinuous change of potential occurs not only when x=1.0 but also when x=2.3, 2.5, 2.6, 3.5 or 4.4. Therefore, in the case of a solid-state secondary lithium battery using $LiCoO_2$ as positive electrode active material and tin as negative electrode active material, the same effect as described above can be obtained by designing batteries in which the amount of the lithium ion inserted corresponding to the generation of the reaction when x=1.0 in the formula (9) at the negative electrode, or the amount of the lithium ion inserted corresponding to the generation of the reaction when x=2.3, 2.5, 2.6, 3.5 or 4.4 in the formula (8) at the negative electrode is equal to or smaller than the amount of extraction of lithium ions corresponding to the generation of the reaction expressed by formula (8) at the positive electrode.

$$LiCoO_2 \rightarrow Li_{0.5}CoO_2 + 0.5Li^+ + 0.5e^- \tag{8}$$

$$Sn + xLi^+ + xe^- \rightarrow Sn-Li_x \tag{9}$$

In the case of an alloy composed of plural different metal elements selected from indium, aluminum, lead, bismuth, antimony, gallium, tin, silver, silicon, zinc, cadminum, arsenic and titanium, they also show plural discontinuous changes of potential consequent to the insertion and extraction reaction of lithium ions. When these substances are used as negative electrode active material, the amount of the lithium ion inserted until discontinuous change of potential described in claim 1 occurs may be of any amount that can cause any of the prescribed patterns of discontinuous changes of potential.

The alloys of these metals or their alloys with lithium may be used in place of said pure metals or their alloys.

In case, for instance, an indium-lithium alloy represented by the formula $In-Li_{0.1}$ is used in place of metallic indium of the above-mentioned solid-state secondary lithium battery using $LiCoO_2$ as the positive electrode active material and indium as the negative electrode active material, the amount corresponding to y in the following formula (10), namely the amount corresponding to y=0.9, is the amount of the lithium ion inserted until the occurrence of discontinuous change of potential.

$$In-Li_{0.1} + yLi^+ + ye^- \rightarrow In-Li_{1.0} \tag{10}$$

It is notable that especially when indium is used as a metal or as a component of a lithium alloy which shows discontinuous change of potential consequent to the insertion and extraction reaction of lithium ions into or from the lithium ion site in the crystal structure, it is possible to obtain a solid-state secondary lithium battery which is capable of operating with a large current because of the high diffusion rate of lithium ions in them. Therefore, in the present invention, indium or an indium-lithium alloy is preferably used as a metal or alloy which shows discontinuous change of potential consequent to the insertion/extraction reaction of lithium ions into or from the lithium ion site in the crystal structure.

It is also remarkable that in case aluminum is used as a metal or a component of a lithium alloy which shows discontinuous change of potential consequent to said lithium ion insertion and extraction reaction, it is possible to obtain a solid-state secondary lithium battery with high energy density because aluminum has a light atomic weight. Therefore, aluminum or an luminum-lithium alloy is also preferred for use as a metal or alloy which shows discontinuous change of potential consequent to said lithium ion insertion and extraction reaction.

Use of transition metal oxides, lithium transition metal oxides, transition metal sulfides and lithium transition metal sulfides as the material showing discontinuous change of potential consequent to said lithium ion insertion and extraction reaction is discussed.

Of these materials, lithium titanium oxide ($Li_{4/3}Ti_{5/d}O_4$) having a spinel structure shows an electrochemical lithium ion insertion reaction represented by the following formula (11) conductive electrolyte, and there takes place discontinuous change of potential when x=1.0. Therefore, the same effect can be obtained in case of using $Li_{4/3}Ti_{5/3}O_4$ in place of indium, etc., described above. $LiTi_2O_4$ is also capable of causing discontnuous change of potential at x=1.0 in the formula (12).

$$Li_{4/3}Ti_{5/3}O_4 + xLi^+ + xe^- \rightarrow Li_{4/3+x}Ti_{5/3}O_4 \tag{11}$$

$$LiTi_2O_4 + xLi^+ + xe^- \rightarrow Li_{1+x}Ti_2O_4 \tag{12}$$

Examples of the transition metal oxides or lithium transition metal oxides capable of causing such discontinuous change of potential consequent to said lithium ion insertion and extraction reactions include $TiO_2$, $MnO_2$, $WO_3$, $WO_2$, $V_2O_5$, etc., or $Li_xTi_2O_2$ $Li_xMnO_2$, $Li_xWO_3$, $Li_xWO_2$, $Li_xV_2O_5$, etc., and use of these materials can be also effective.

As the transition metal sulfide or lithium transition metal sulfide, there can be used, for example, $TiS_2$, $MOS_2$, $NbS_2$, $WS_2$ $FeMo_6S_8$ and $V_2S_5$ or $Li_xTiS_2$, $Li_xMnS_2$, $Li_xNbS_2$, $Li_xWS_2$, $Li_xMo_6S_8$ and $Li_xV_2S_5$ as these materials show discontinuous change of potential consequent to the lithium ion insertion reaction.

The problems relating to the cycle characteristics of the battery resulting from structural instability due to extraction of lithium ions in a lithium transition metal compound described above become serious especially in a battery assembly in which a plurality of unit cells are connected in series connection. However, by using an above-described solid-state secondary lithium battery at least as the unit cell having the smallest capacity in the set of the series-connected unit cells, it is possible to keep the unit cells at a depth of charging that allows development of a desired cycle performance. Therefore, the present invention finds its particularly useful application to battery assemblies.

Since said solid-state secondary lithium battery has no common electrolyte effect, a plurality of unit cells can be housed in a single airtight container, allowing simple and compact design of the battery case and manufacture of the uncostly battery assemblies.

Even in such a battery assembly, the terminal voltage shows a discontinuous change in relation to the charged quantity of electricity, so that it is recommended to charge at a voltage below $V_2$ in a battery assembly where there takes place discontinuous change of voltage from $V_1$ to $V_2$.

When the term "potential" is used in the present specification, it refers to not only equilibrium potential but also mixed potential in a two-phase mixed state.

"Discontinuous change of potential" means that a sharp change of potential occurs with change of x in, for instance, the formula (6). That is, it means that when, for instance, the potential of In—$Li_x$ in the formula (6) is supposed to be E, the rate of change of E to change of x (dE/dx) is maximized. Thus, the above term does not simply mean discontinuity in a strictly mathematical sense, in other words, its meaning is not limited to the case where dE/dx diverges.

Said "sharp change of potential" is preferably the type of change described below. In a solid-state secondary lithium battery, in case an electrochemical reaction represented by the formula (13) is induced by a combination of a lithium transition metal oxide used as positive electrode active material, which causes the reversible electrochemical insertion and extraction reactions of lithium ions into or from the lithium ion site in the crystal structure, and a material used as negative electrode material, which shows a discontinuous change of potential consequent to the lithium ion insertion and extraction reaction, there holds at least the relation of $dE_n(x_0)/dx > dE_p(X_0)/dx$, preferably $dE_n(x_0)/dx > 5V$, between the rate of change $(dE_p(x)/dx)$ of positive electrode potential $(E_p(x))$ and the rate of change $(dE_n(x)/dx)$ of negative electrodoe potential $(dE_n(x))$ in the composition $x=x_0$ showing a discontinuous change of potential.

Positive electrode reaction:  $LiMeO_2 \rightarrow Li_{1-x}MeO_2 + xLi^+ + xe^-$ Negative electrode reaction: 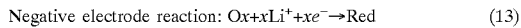 $Ox + xLi^+ + xe^- \rightarrow Red$ (13)

When $dE_n(x)/dx$ is smaller than the value that satisfies the above relation, the battery tends to be charged deeply due to change of overvoltage or variation of charging voltage, making it hardly possible to obtain a solid-state secondary lithium battery with excellent charge and discharge characteristics.

Ox in the formula (13) represents a composition containing a mother-phase metal such as In or Al in the case of In—$Li_x$, Al—$Li_x$ or like alloy, and containing one transition metal atom undergoing change of valence shown in the formula (13) in the case of a transition metal oxide or transition metal sulfide. More specifically, it represents a composition such as $Ti^{4+}S_2$ or $Li[Li_{1/3}Ti_{2/3}]Ti^{4+}O_4$, in which valency is affixed only to the transition metal element which is varied in formal valence.

It has been pointed out that the volumetric change of the electrode active material greatly affects the cycle characteristics of a solid battery. For instance, in the reaction (formula (14)) of forming an aluminum-lithium alloy by an electrochemical reaction of Al and $Li^+$, the crystal structures of Al and Al—Li are both of a cubic system, and their lattice constants are 4.049A and 6.373A, respectively. Consequently, Al occludes Li to form an Al—Li alloy, effecting approximately 3.9-fold expansion of volume of the electrode active material.

 $Al + Li^+ + e^- \rightarrow Al$—Li (14)

In contrast with such electrode active materials which are subject to a large change of volume, there has been reported a composition $Li_{4/3}Ti_{5/3}O_4$ having a spinel structure has been reported as an electrode active material which is very small in change of volume on electrochemical reaction with $Li^+$. When a solid battery is constructed by using $Li_{4/3}Ti_{5/3}O_4$ as electrode active material, there is scarcely produced the influence of volumetric change such as mentioned above, so that use of this material is expected to contribute to the realization of a solid battery having even more excellent cycle characteristics.

As a solid-state battery using $Li_{4/3}Ti_{5/3}O_4$ as electrode active material, there has been proposed the one using $Li_{0.33}La_{0.56}TiO_3$ as solid electrolyte (T. Brousse, P. Eragnaud, R. Marchand and D. M. Schleich: Extended Abstracts of 8th International Meeting on Lithium Batteries, 324 (1996), Nagoya; hereinafter referred to as Reference 1). However, since $Li_{0.33}La_{0.56}TiO_3$ is a solid electrolyte containing transition metal atoms, it involves the problem that it is prone to electrochemical reduction. For example, the solid electrolyte tends to be reduced during charging at the interface of the negative electrode, consequently lessening the discharged capacity relative to the charged capacity as shown in FIG. 1 in Reference 1.

As viewed above, even when $Li_{4/3}Ti_{5/3}O_4$ is used as electrode active material, the charge/discharge efficiency is deteriorated depending on the selection of solid electrolyte, causing instabilization of the battery characteristics.

In contrast, an amorphous lithium ion conductive solid electrolyte mainly composed of sulfides is electrochemically stable even at or around the reducing potential of $Li_{4/3}Ti_{5/3}O_4$, and by combined use of this solid electrolyte, it was realized for the first time to obtain high charge and discharge efficiency with $Li_{4/3}Ti_{5/3}O_4$ and to produce a solid battery having excellent cycle characteristics.

The present invention is further illustrated by the following examples. All of the operations described in the following Examples were carried out under a dry argon atmosphere.

EXAMPLES

Example 1

A solid-state secondary lithium battery was made by using lithium cobalt oxide ($LiCoO_2$) as a lithium transition metal oxide showing the reversible electrochemical insertion and extraction reactions of lithium ions into or from the lithium ion site in the crystal structure and used as positive electrode active material, indium as the material showing discontinuous change of potential consequent to the insertion and extraction reactions of lithion ions into or from the lithium ion site in the crystal structure, and an amorphous solid electrolyte ($0.01Li_3PO_4$-$0.63Li_2S$-$0.36SiS_2$) as a lithium ion conductive solid electrolyte, and the properties of the produced battery were evaluated. Details of the process are described below.

First, a lithium ion conductive solid electrolyte was synthesized in the following way.

Lithium sulfide, silicon sulfide and lithium phosphate were weighed and mixed in a ratio of 63:36:1. This mixture was filled in a glassy carbon-made crucible and melted at 1,000° C. in an argon gas stream for 2 hours. The melt was rapidly cooled with twin rolls to prepare a lithium ion conductive solid electrolyte.

Then $LiCoO_2$ was synthesized by weighing and mixing cobalt oxide ($Co_3O_4$) and lithium carbonate ($Li_2CO_3$) so that the mixture would have a Co/Li ratio of 1 and calcining the mixture at 900° C. in the atmosphere.

Using the thus obtained lithium ion conductive solid electrolyte, a positive electrode active material and a foil of metallic indium, a solid-state secondary lithium battery was constructed in the following way.

Figure 3:
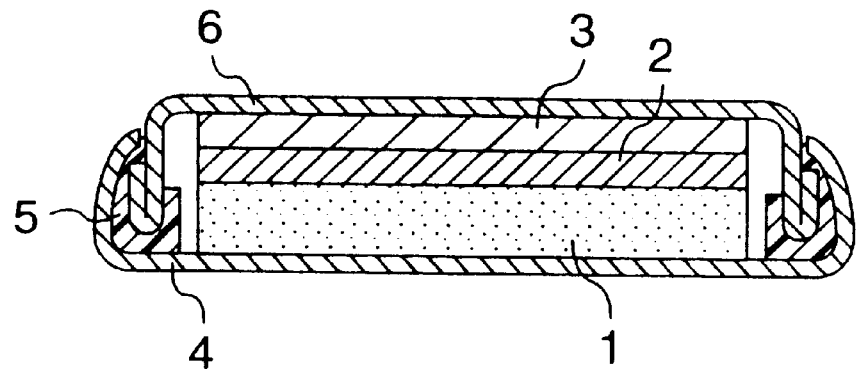
FIG. 3 is a cross sectional view of the solid-state secondary lithium battery in an embodiment of the present invention.

A sectional view of the solid-state secondary lithium battery A according to the instant embodiment of the invention is shown in FIG. 3. In the drawing, reference numeral 1 designates positive electrode constituted by using weighed 300 mg of a positive electrode material prepared by mixing said $LiCoO_2$ and the pulverized solid electrolyte in a weight ratio of 6:4. Numeral 2 refers to a lithium ion conductive solid electrolyte layer which was pressure molded integrally with a metallic indium foil 3 weighing 95 mg, which constitutes the negative electrode. The stacked molded pellets were put into a stainless steel-made battery container 4 and the container was closed airtightly by a stainless steel-made cover 6 with the aid of an insulating gasket 5.

In this solid-state secondary lithium battery A, the maximum (amount of) extraction of lithium ions within the range where the reversible insertion/extaction reaction of lithium ions into or from the lithium cobalt oxide take place is 24.6 mAh, which corresponds to the reaction of the formula (8), while the lithium ion inserted until discontinuous change of potential of indium in the course of the insertion/extraction reaction of lithium ions into or from indium occurs is 22.2 mAh, which corresponds to the reaction of the formula (3). In this battery, therefore, the amount of the lithium ion inserted until the occurrence of discontinuous change of potential of the material showing discontinuous change of potential consequent to the lithium ion ionsertion and extraction reaction is smaller than the maximum extraction of lithium ions which causes reversible reaction range of the lithium transition metal oxide.

By way of comparison, a solid-state secondary lithium battery B was constructed in the same way as described above except that the indium foil weighed 190 mm. In this battery, the amount of lithium ion inserted until discontinuous change of indium potential occurred corresponded to 44.4 mAh, and the amount of lithium ion inserted until potential of the material showing discontinuous change of potential consequent to the lithium ion insertion/extraction reaction changed discontinously was greater than the maximum amount of extraction of lithium ions of the reversible reaction range of the lithium transition metal oxide.

Figure 4:
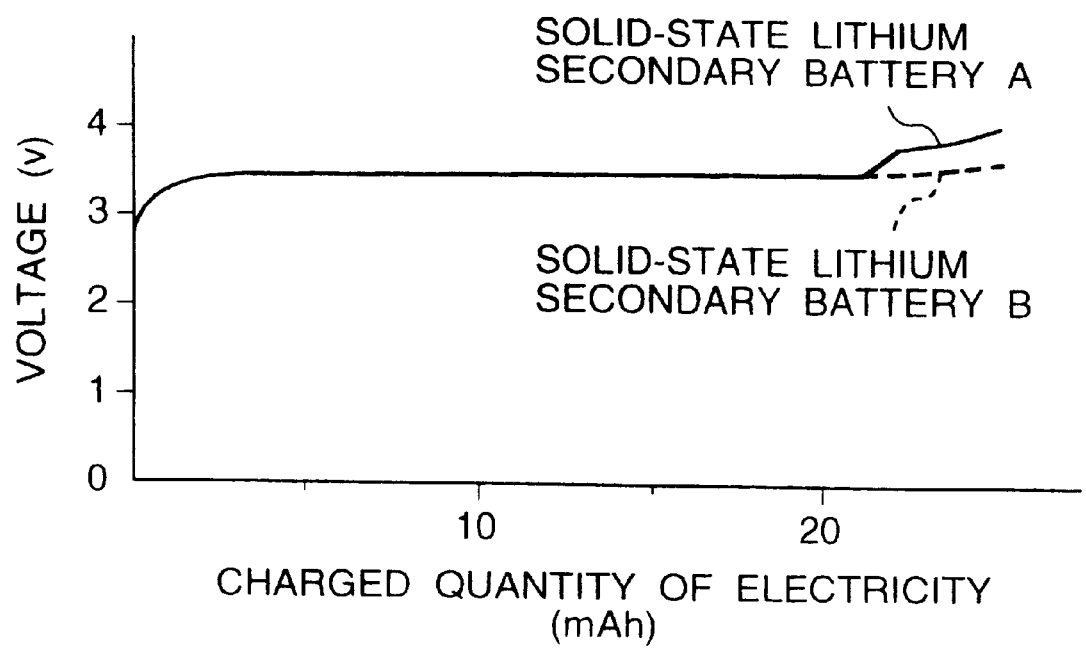
FIG. 4 is a diagram showing the charging curves of the solid-state secondary lithium battery in an embodiment of the present invention and that according to the comparative example.

The thus obtained solid-state secondary lithium batteries were charged by applying a current of 500 $\mu A$. FIG. 4 shows the first charging curves of these batteries. In the case of the solid-state secondary lithium battery A, the voltage 3.85 V at which discontinuous change of the charging curve occurred was made the termination voltage of charging. In the case of the solid-state secondary lithium battery, the terminal voltage on charging of 24.6 mAh was made the charge termination voltage.

Figure 5:
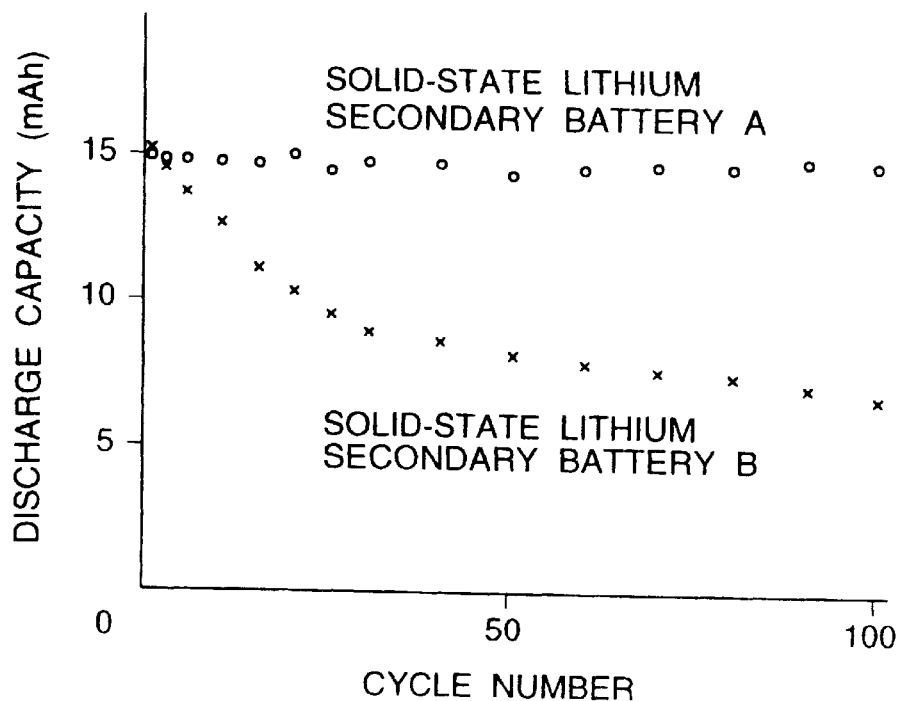
FIG. 5 is a diagram showing the charge and discharge cycle characteristics of the solid-state secondary lithium battery in an embodiment of the present invention and that according to the comparative example.

The charge termination voltage was decided in this way. Further, with the discharge termination voltage being set at 2.0 V, a charge and discharge cycle test with a charge/discharge current of 500 $\mu A$ was conducted. FIG. 5 shows the discharged quantity of electricity in each cycle.

In the solid-state secondary lithium battery A according to the present invention, there was observed little change of the discharged quantity of electricity with the charge and discharge cycle, but in the solid-state lithium seconary battery B made for the purpose of comparison, there was seen a drop of discharge capacity with the charge and discharge cycle.

Then, influence of drift of charge voltage on the charge and discharge cycle behavior was examined in the following way.

Figure 6:
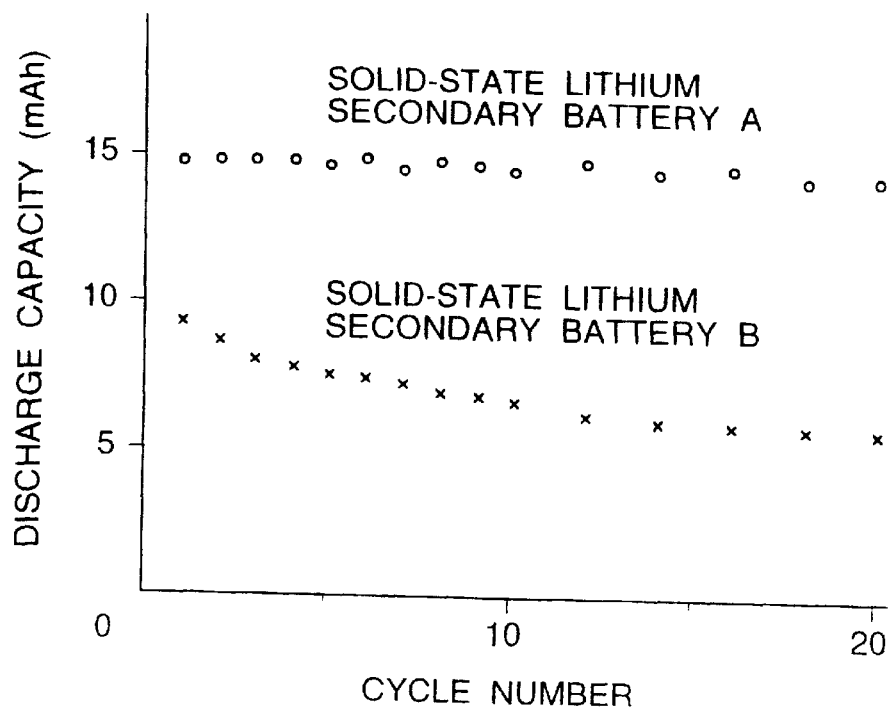
FIG. 6 is a diagram showing the charge and discharge cycle characteristics of the solid-state secondary lithium battery in an embodiment of the present invention and that according to the comparative example.

For the charger, there was used a power source capable of generating a voltage equal to a combination of a DC voltage of 3.75 V and an AC voltage with an amplitude of 0.1 V and a frequency of 1 mHz. Each of the solid-state secondary lithium batteries was subjected to a charge and discharge cycle test in which each battery was first charged for 50 hours by said charger and then discharged to 2.0 V with a constant current of 500 $\mu A$, with the discharge capacity in each cycle being recorded. The results are shown in FIG. 6.

In the solid-state secondary lithium battery A, there was observed little change in discharge capacity with the charge and discharge cycle, while in the solid-state secondary lithium battery B, discharge capacity was low from the beginning and a further drop of discharge capacity was seen as the charge and discharge cycle went on.

It has thus been confirmed that a solid-state secondary lithium battery with excellent charge and discharge cycle characteristics can be obtained according to the present invention.

Example 2

A solid-state secondary lithium battery was constructed in the same way as in Example 1 except that aluminum was used in place of indium as the material showing discontinuous change of potential consequent to the insertion/extraction reaction of lithium ions into or from the lithium ion site in the crystal structure, and the properties of this battery were evaluated. The process is detailed below.

A lithium ion conductive solid electrolyte and a lithium cobalt oxide were synthesized, weighed and mixed in the same way as in Example 1 to form the positive electrode of the battery.

A 1:5 (by weight) mixture of a pulverized solid electrolyte and pulverized metallic aluminum was used as negative electrode material. 25 mg of this negative electrode material was weighed and worked to form the negative electrodeof the battery.

Using the thus obtained positive and negative electrodes, a solid-state secondary lithium battery C was made in the same way as in Example 1. In this battery, the maximum amount of extraction of lithium ions within the rarge, where the reversible insertion and extraction reactions of lithium ions into or from the lithium cobalt oxide take place, was 24.6 mAh, the same as in Example 1, and the amount of lithium ions inserted until discontinuous change of potential of aluminum in the insertion/extraction reactions of lithium ions into or from aluminum took place was 20.7 mAh corresponding to the reaction of the formula (4). In this battery, therefore, the amount of insertion of lithium ions until potential of the material showing discontinuous change of potential consequent to the lithium ion ensertion/extraction reaction changes discontinuously is smaller than the maximum amount of extraction of lithium ions of the reversible insertion/extraction reactions of lithium ions into or from the lithium transition metal oxide.

Then, by way of comparison, a solid-state secondary lithium battery D was made in the same way as described above except that the negative electrode weighed 50 mg. In this battery, the amount of lithium ion inserted until discontinuous change of aluminum potential took place was 41.4 mAh, and the amount of lithium ions inserted until potential of the material showing discontinuous change of potential consequent to with the amount of lithium ion insertion and extraction reaction changed discontinously was greater than the maximum extraction amount of lithium ions of reversible reaction range.

The thus constructed solid-state secondary lithium batteries were subjected to the same charge and discharge test as conducted in Example 1. In the case of the solid-state secondary lithium battery C according to the present invention, the voltage which caused discontinuous change of the charging curve was set as the charge termination voltage, while in the comparative solid-state secondary lithium battery D, the terminal voltage on charging of 24.6 mAh was set as the charge termination voltage.

As a result, in the solid-state secondary lithium battery C according to the present invention, there was observed little change of discharged quantity of electricity with the charge and discharge cycle, but in the comparative solid-state secondary lithium battery D, there was seen a drop of discharge capacity with the charge and discharge cycle.

Then, influence of draft of charge voltage on the charge and discharge cycle behavior was examined in the same way as in Example 1 except that the DC voltage of the charger was set at 4.05 V.

As a result, in the solid-state secondary lithium battery C, there was observed substantially no drop of discharge capacity with the charge and discharge cycle, while in the solid-state secondary lithium battery D, discharge capacity was low from the beginning and a further drop of discharge capacity was seen as the charge and discharge cycle went on.

It has thus been confirmed that a solid-state secondary lithium battery with excellent charge and discharge cycle characteristics can be obtained according to the present invention.

Examples 3–13

The solid-state secondary lithium batteries were constructed in the same way as in Example 2 except that the materials shown in Table 1 were used, in place of aluminum, as the material showing discontinuous change of potential consequent to the insertion/extraction reactions of lithium ions into or from the lithium ion site in the crystal structure, and the charge and discharge cycle behavior of these batteries under the condition of constant current application and influence of drift of charge voltage on the charge and discharge cycle were examined in the same way as in Example 2. The negative electrodes of these batteries were prepared by using the weighed amounts (shown in Table 1) of the 5:1 (by weight) mixtures of said metals or alloys and a pulverized solid electrolyte. Also shown in Table 1 are the maximum amount of extraction Q1 of lithium ions which causes the reversible insertion/extraction reactions of lithium ions into or from the lithium cobalt oxide in each battery and the insertion amount Q2 of lithium ions until of discontinuous change of potential of the negative electrode took place in the course of the insertion/extraction reactions of lithium ions into or from the negative electrode of each battery. In these batteries, Q2<Q1.

There was observed no drop of discharge capacity with the charge and discharge cycle, and it has been confirmed that a solid-state secondary lithium battery with excellent charge and discharge cycle characteristics can be obtained according to the present invention.

TABLE 1

| | Negative electrode active material | Negative electrode weight (mg) | Q1 (mah) | Q2 (mah) |
|---|---|---|---|---|
| Example 3 | Lead | 100 | 24.6 | 21.6 |
| Example 4 | Bismuth | 100 | 24.6 | 21.3 |
| Example 5 | Antimony | 40 | 24.6 | 18.8 |
| Example 6 | Gallium-lithium alloy $Ga_{1.0}$—$Li_{0.21}$ | 60 | 24.6 | 18.8 |
| Example 7 | Tin | 45 | 24.6 | 21.2 |
| Example 8 | Silver | 50 | 24.6 | 20.7 |
| Example 9 | Silicon | 5 | 24.6 | 15.9 |
| Example 10 | Zinc | 60 | 24.6 | 20.5 |
| Example 11 | Cadminum | 100 | 24.6 | 19.9 |
| Example 12 | Arsenic | 20 | 24.6 | 17.9 |
| Example 13 | Titanium | 40 | 24.6 | 18.7 |

Example 14

A solid-state secondary lithium battery was constructed in the same way as in Example 1 except that a lead-indium alloy was used in place of indium as the material showing discontinuous change of potential consequent to the insertion/extraction reaction of lithium ions into or from the lithium ion site in the crystal structure, and the properties of the obtained battery were evaluated. The process is detailed below.

The lead-indium (Pb—In) alloy was prepared by melting a 1:1 (by mole) mixture of metallic lead and metallic indium at 800° C. in an argon stream.

A lithium ion conductive solid electrolyte and a lithium cobalt oxide were synthesized, weighed and mixed in the same way as in Example 1 to form the positve electrode of the battery.

A 1:5 (by weight) mixture of a pulverized solid electrolyte and a pulverized lead-indium alloy was used as negative electrode material, and 100 mg of this negative electrode material was weighed and worked into the negative electrode of the battery.

In the insertion reaction of lithium ions into this negative electrode, the amount of insertion of lithium ions causing discontinuous change of potential of the negative electrode was 6.94 mAh corresponding to the reaction of the formula (15):

$$Pb\text{—}In+Li^{+}+e^{-}\rightarrow Pb\text{—}In\text{—}Li \qquad (15)$$

and 20.18 mAh corresponding to the reaction of the formula (16):

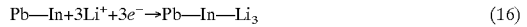

$$Pb\text{—}In+3Li^{+}+3e^{-}\rightarrow Pb\text{—}In\text{—}Li_{3} \qquad (16)$$

A 6:4 (by weight) mixture of $LiCoO_2$ obtained in Example 1 and a pulverized solid electrolyte was used as positive electrode material. 91 mg of this positive electrode material was weighed and worked, and a solid-state secondary lithium battery E was constituted in the same way as in Example 1. Another solid-state secondary lithium battery F was made likewise except for using 304 mg of said positive electrode material.

In these solid-state secondary lithium batteries, the maximum amount of extraction of lithium ions within the range of the reversible insertion/extraction reactions of lithium ions into or from the lithium cobalt oxide was 7.5 mAh in the case of the battery E corresponding to the reaction of the formula (8) and 25 mAh in the case of the battery F, and was greater than the amount of insertion of lithium ions causing discontinuous change of potential of the negative electrode corresponding to the reaction of the formula (15) or (16).

In the thus constructed solid-state secondary lithium batteries, influence of drift of charge voltage on the charge and discharge cycle behaviors was examined in the same way as in Example 1.

There was observed no drop of discharge capaicity with the charge and discharge cycle, and it has been confirmed that a solid-state secondary lithium battery with excellent charge and discharge cycle characteristics can be obtained according to the present invention.

Example 15

A solid-state secondary lithium battery was made in the same way as in Example 1 except that a lithium titanium oxide was used in place of indium as the material showing discontinuous change of potential consequent to the insertion/extraction reaction of lithium ions into or from the lithium ion site in the crystal structure, and the properties of the battery were evaluated. The process is detailed below.

First, lithium titanium oxide was synthesized in the following way.

Lithium hydroxide (LiOH) and titanium oxide (TiO$_2$) were used as starting materials. The starting materials were weighed and mixed so that the mixture would have a Li:Ti ratio of 4:5. This mixture was pressure molded into pellets and heated at 900° C. in the air for 20 hours to obtain lithium titanium oxide of the formula $Li_{4/3}Ti_{5/3}O_4$.

A lithium ion conductive solid electrolyte and a lithium cobalt oxide were synthesized, weighed and mixed in the same way as in Example 1 to form the positive electrodeof the battery.

A 2:3 (by weight) mixture of a pulverized solid electrolyte and the lithium titanium oxide obtained in the manner described above was used as negative electrode material. 209 mg of this negative electrode material was weighed and worked into the negative electrode of the battery.

Using the thus prepared positive and negative electrodes, a solid-state secondary lithium battery G was constructed in the same way as in Example 1. In this battery G, the maximum amount of extraction of lithium ions within the reversible insertion/extraction reaction range of lithium ions into or from the lithium cobalt oxide was 24.6 mAh, the same as in Example 1, while the insertion amount of lithium ions until discontinuous change of potential of the lithium titanium oxide took place in the insertion/extraction reactions of lithium ions into or from thelithium titanium oxide was 22 mAh corresponding to the reaction of the formula (17):

$$Li_{4/3}Ti_{5/3}O_4 + Li^+ + e^- \rightarrow Li_{7/3}Ti_{5/3}O_4 \qquad (17)$$

In this battery, therefore, the amount of insertion of lithium ions until potential of the material showing discontinuous change of potential consequent to the lithium ion insertion/extraction reaction changes discontinuously is smaller than the maximum amount of extraction of lithium ions within the reversible insertion/extraction of lithium ions into or from the lithium transition metal oxide.

Then, by way of comparison, a solid-state secondary lithium battery H was made in the same way as described above except that the negative electrode weighed 518 mg. In this battery, the amount of lithium ions inserted until discontinous change of potential of the lithium titanium oxide took place was 44 mAh, and the amount of lithium ions inserted until potential of the material showing discontinuous change of potential consequent to the lithium ion insertion/extraction reaction changed discontinuously was greater than the maximum amount of extraction of lithium ions which causes reversible insertion/extraction reaction of lithium ions into or from the lithium transition metal oxide.

The thus constructed solid-state secondary lithium batteries were subjected to the same charge and discharge test as conducted in Example 1. In the case of the solid-state secondary lithium battery G according to the present invention, the voltage at discontinuous change of the charging curve was set as the charge termination voltage, while in the case of the comparative solid-state secondary lithium battery H, the terminal voltage on charging of 24.6 mAh was set as the charge termination voltage.

As a result, in the solid-state secondary lithium battery G according to the present invention, there was observed little change in discharged quantity of electricity with the charge and discharge cycle, while in the comparative solid-state secondary lithium battery H, there was seen a drop of discharge capacity with the charge and discharge cycle.

Next, the charge and discharge cycle was examined in the same way as in Example 1 except that the DC voltage of the charger was set at 3.25 V.

As a result, in the solid-state secondary lithium battery G, there was observed substantially no drop of discharge capacity with the charge and discharge cycle, while in the solid-state secondary lithium battery H, discharge capacity was low from the beginning and a further drop of discharge capacity with the charge and discharge cycle was seen.

It has thus been confirmed that a whole-solid secondary lithium battery with excellent charge and discharge cycle characteristics can be obtained according to the present invention.

Example 16

A solid-state secondary lithium battery was made in the same way as in Example 1 except that titanium disulfide was used in place of indium as the material showing discontinuous change of potential consequent to the insertion/extraction reaction of lithium ions into or from the lithium ion site in the crystal structure, and the properties of the battery were evaluated. The process is detailed below.

Titanium disulfide (TiS$_2$) was synthesized by the CVD method using sulfur and metallic titanium as starting materials.

A lithium ion conductive solid electrolyte and a lithium cobalt oxide were synthesized, weighed and mixed in the same way as in Example 1 to form the positive electrode of the battery.

A 2:3 (by weight) mixture of a pulverized solid electrolyte and the titanium disulfide obtained in the manner described above was used as negative electrode material. 153 mg of this negative electrode material was weighed and worked into the negative electrode of the battery.

Using the thus prepared positive and negative electrodes, a solid-state secondary lithium battery I was made in the same way as in Example 1. In this whole-solid secondary lithium battery, the maximum amount of lithium ion extraction within the range where the reversible insertion/extraction reactions of lithium ions into or from the lithium cobalt oxide are reversible was 24.6 mAh, the same as in Example 1, while the amount of lithium ions inserted until discontinuous change of potential of titanium disulfide took place in the insertion/extraction reaction of lithium ions into or from titanium disulfide was 22 mAh corresponding to the reaction of the formula (18):

$TiS_2 + Li^+ + e^- \rightarrow LiTiS_2$ (18)

In this battery, therefore, the amount of lithium ion inserted until potential of the material showing discontinuous change of potential consequent to the lithium ion insertion/extraction reaction changes discontinuously is smaller than the maximum amount of extraction of lithium ions within the casuses reversible insertion/extraction range of lithium ions into or from the lithium transition metal oxide.

Then, by way of comparison, a solid-state secondary lithium battery J was made in the same way as described above except that the negative electrode weighed 306 mg. In this battery, the amount of lithium ions inserted until discontinuous change of potential of lithium titanium oxide took place was 44 mAh, and hence the amount of lithium ions inserted until potential of the material showing discontinuous change of potential consequent to the lithium ion insertion/extraction reaction change discontinuously was greater than the maximum amount of extraction of lithium ions within the rarge where the insertion/extraction reactions of lithium ions into or from the lithium transition metal oxide are reversible.

These solid-state secondary lithium batteries were subjected to the same charge and discharge test as conducted in Example 1. In the case of the battery I according to the present invention, the voltage in discontinuous change of the charging curve was set as the charge termination voltage, while in the case of the comparative battery J, the terminal voltage on charging of 24.6 mAh was set as the charge termination voltage.

As a result, in the solid-state secondary lithium battery I according to the present invention, there was observed substantially no change in discharged quantity of electricity with the charge and discharge cycle, while in the comparative solid-state secondary lithium battery J, there was seen a drop of discharge capacity with the charge and discharge cycle.

Then, the charge and discharge cycle was examined in the same way as in Example 1 except that the DC voltage of the charger was set at 2.5 V.

As a result, in the solid-state secondary lithium battery I, there was observed substantially no drop of discharge capacity with the charge and discharge cycle, while in the solid-state secondary lithium battery J, discharge capacity was small from the beginning and there was seen a further drop of discharge capacity with the charge and discharge cycle.

It has thus been confirmed that a solid-state secondary lithium battery with excellent charge and discharge cycle characteristics can be obtained according to the present invention.

Example 17

A solid-state secondary lithium battery was made in the same way as in Example 1 except that a lithium nickel oxide ($LiNiO_2$) was used in place of the lithium cobalt oxide ($LiCoO_2$) as positive electrode active material. The process is detailed below.

First, $LiNiO_2$ was synthesized by mixing nickel oxide (NiO) and lithium hydroxide and heating the mixture at 800° C. in the atmosphere.

The thus obtained $LiNiO_2$ was pulverized and mixed with the solid electrolyte obtained in Example 1 in a weight ratio of 3:2 to prepare a positive electrode material. A solid-state secondary lithium battery K was made in the same way as in Example 1 except that 300 mg of said positive electrode material was weighed and worked into positive electrode.

In this solid-state secondary lithium battery, the maximum amount of extraction of lithium ions within the range where the insertion/extraction reaction of lithium ions into or from the lithium cobalt oxide is reversible is 24.7 mAh corresponding to the reaction of the formula (19):

$$LiNiO_2 \rightarrow Li_{0.5}NiO_2 + 0.5Li^+ + 0.5e^- \qquad (19)$$

The amount of lithium ions inserted until discontinuous change of potential of indium takes place in the course of the insertion/extraction reaction of lithium ions into or from indium is 22.2 mAh corresponding to the reaction of the formula (3) as in Example 1. In this battery, therefore, the amount of lithium ions inserted until potential of the material showing discontinuous change of potential in the course of the lithium ion insertion/extraction reaction changes discontinuously is smaller than the maximum extraction of lithium ions that does not cause irreversible insertion and extraction of lithium ions into or from the lithium transition metal oxide.

Then, by way of comparison, a solid-state secondary lithium battery L was made in the same way as described above except that the indium foil weighed 190 mg. In this battery, the amount of lithium ion inserted until discontinuous change of potential of indium takes place is 44.4 mAh, and the amount of lithium ions inserted until potential of the material showing discontinuous change of potential consequent to the lithium ion insertion/extraction reaction changes discontinuously is greater than the maximum extraction of lithium ions within the reversible insertion/extraction of lithium ions into or from the lithium transition metal oxide.

The thus composed solid-state secondary lithium battery was subjected to the same charge and discharge test as conducted in Example 1. In the case of the battery K according to the present invention, the voltage when the charging curve was discontinuously charged was set as the charge termination voltage, while in the comparative battery L, the terminal voltage on charging of 24.6 mAh was set as the charge termination voltage.

As a result, in the battery K of the present invention, there was observed substantially no change in discharged quantity of electricity with the charge and discharge cycle, while in the comparative battery L, there was seen a drop of discharge capacity with the charge and discharge cycle.

Next, influence of time-dependent variation of the charging voltage on the cycle behavior was examined in the same way as in Example 1 except that the DC voltage of the charger was set at 3.5 V.

As a result, in the battery K, there was observed substantially no drop of discharge capacity with the charge and discharge cycle, while in the battery L, discharge capacity was small from the beginning and a further drop of discharge capacity was seen with the charge and discharge cycle.

It has thus been confirmed that a solid-state secondary lithium battery with excellent charge and discharge cycle characteristics can be obtained according to the present invention.

Example 18

A solid-state secondary lithium battery was made in the same way as in Example 1 except that a lithium manganese oxide ($LiMn_2O_4$) was used in place of the lithium cobalt oxide ($LiCoO_2$) as positive electrode material. The process is detailed below.

$LiMn_2O_4$ was synthesized by mixing lithium carbonate ($Li_2CO_3$) and manganese acetate ($Mn(CH_3COO)_2$) and heating the mixture at 750° C. in the atmosphere.

The thus obtained $LiMn_2O_4$ was pulverized and mixed with the solid electrolyte obtained in Example 1 and acetylene black (electron conductive material) in a weight ratio of 3:1.9:0.1 to prepare a positive electrode material. A solid-state secondary lithium battery M was made in the same way as in Example 1 except that 432 mg of said positive electrode material was weighed and worked into positive electrode.

In this solid-state secondary lithium battery M, the maximum amount of extraction of lithium ions in the range of the reversible insertion/extraction reactions of lithium ions into or from the lithium manganese oxide was 25.0 mAh corresponding to the reaction of the formula (20):

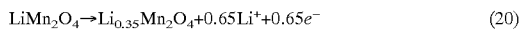

$$\text{LiMn}_2\text{O}_4 \rightarrow \text{Li}_{0.35}\text{Mn}_2\text{O}_4 + 0.65\text{Li}^+ + 0.65e^- \qquad (20)$$

while the amount of lithium ion inserted until discontinuous change of potential of indium took place in the course of the insertion/extraction reaction of lithium ions into or from indium was 22.2 mAh corresponding to the reaction of the formula (3) as in Example 1. In this battery, therefore, the lithium ions inserted until potential of the material showing discontinuous change of potential consequent to with the lithium ion insertion/extraction reaction changes discontinuously is smaller than the maximum extraction of lithium ions within the reversible insertion/extraction of lithium ions into or from the lithium transition metal oxide.

Then, by way of comparison, a solid-state secondary lithium battery N was made in the same way as described above except that the indium foil weighed 190 mg. In this battery, the amount of lithium ions inserted until discontinuous change of potential of indium took place was 44.4 mAh, and the lithium ion inserted until potential of the material showing discontinuous change of potential consequent to the lithium ion insertion/extraction reaction changes discontinuously is greater than the maximum extraction of lithium ions within the reversible insertion/extraction of lithium ions into or from the lithium transition metal oxide.

The thus composed solid-state secondary lithium batteries were subjected to the same charge and discharge test as conducted in Example 1. In the case of the battery M according to the present invention, the voltage at discontinuous change of the charging curve was set as the charge termination voltage, while in the comparative battery N, the terminal voltage on charging of 24.6 mAh was set as the charge termination voltage.

As a result, in the battery M according to the present invention, there was observed substantially no change in discharged quantity of electricity with the charge and discharge cycle, while in the comparative battery N, there was seen a drop of discharge capaicty with the charge and discharge cycle.

Then, the charge and discharge cycle behavior on time-dependent variation of charging voltage was examined the same way as in Example 1 except that the DC voltage of the charger was set at 3.65 V.

As a result, in the battery M, there was observed substantially no degradation of discharge capacity with the charge and discharge cycle, while in the battery N, discharge capacity was low from the beginning and there was observed a further drop of discharge capacity with the charge and discharge cycle.

It has thus been confirmed that a solid-state secondary lithium battery with excellent charge and discharge cycle characteristics can be obtained according to the present invention.

Example 19

A solid-state lithium battery was made in the same way as in Example 1 except that an amorphous solid electrolyte (0.05Li$_2$O-0.57Li$_2$S-0.38SiS$_2$) was used in place of 0.01Li$_3$PO$_4$-0.63Li$_2$S-0.36SiS$_2$ obtained in Example 1 as the lithium ion conductive solid electrolyte, and the properties of the battery were evaluated. The process is detailed below.

Lithium sulfide, silicon sulfide and lithium oxide were weighed and mixed in a molar ratio of 57:38:5, and the mixture was filled in a glassy carbon-made crucible and melted at 1,000° C. in a nitrogen gas stream for 2 hours. The melt was ultra-rapidly cooled by a twin roll in the same way as in Example 1 to obtain a lithium ion conductive solid electrolyte.

Using this lithium ion conductive solid electrolyte, there were made a solid-state secondary lithium battery according to the present invention and a comparative solid-state secondary lithium battery, both using the same amount of indium foil as in Example 1, and these batteries were subjected to the same charge and discharge test as conducted in Example 1.

As a result, in the battery according to the present invention, there was observed substantially no change in discharged capacity with the charge and discharge cycle, while in the comparative battery, there was seen a decrease of discharge capacity with the charge and discharge cycle.

Then, the charge and discharge cycle behavior on time-dependent variation of charging voltage was examined in the same way as in Example 1.

As a result, the battery of the present invention showed substantially no drop of discharge capacity with the charge and discharge cycle, while the comparative battery was small in discharge capacity from the beginning and showed a further drop of discharge capacity with the charge and discharge cycle.

It has thus been confirmed that a solid-state secondary lithium battery with excellent charge and discharge cycle characteristics can be obtained according to the present invention.

Example 20

A battery assembly was constructed by using a lithium cobalt oxide (LiCoO$_2$) as the lithium transition metal oxide which causes the reversible electrochemical insertion/extraction reactions of lithium ions into or from the lithium ion site in the crystal structure and is used as positive electrode active material as in Example 1, indium as the material showing discontinuous change of potential consequent to insertion/extraction reaction of lithium ions, and an amorphous solid electrolyte (0.01Li$_3$PO$_4$-0.63Li$_2$S-0.36SiS$_2$) as the lithium ion conductive solid electrolyte, and the properties of this battery were evaluated. The process is detailed below.

Figure 7:
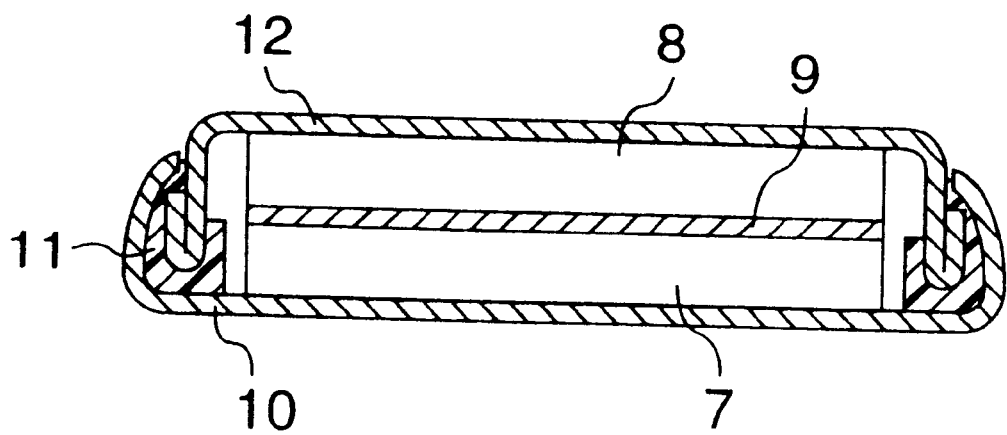
FIG. 7 is a cross sectional view of the battery assembly in an embodiment of the present invention.

A sectional view of the battery assembly according to the instant embodiment of the invention is shown in FIG. 7, and the compositions of the unit cells are shown in Table 2.

TABLE 2

| Battery assembly | Unit cell (i) | | | | Unit cell (ii) | | | |
|---|---|---|---|---|---|---|---|---|
| | Positive electrode (mg) | Negative electrode (mg) | Q1 (mAh) | Q2 (mAh) | Positive electrode (mg) | Negative electrode (mg) | Q1 (mAh) | Q2 (mAh) |
| S1 | 150 | 50 | 12.3 | 11.7 | 150 | 50 | 12.3 | 11.7 |
| S2 | 150 | 50 | 12.3 | 11.7 | 150 | 70 | 12.3 | 16.3 |
| S3 | 150 | 50 | 12.3 | 11.7 | 120 | 50 | 9.9 | 11.7 |
| S4 | 120 | 50 | 9.9 | 11.7 | 120 | 50 | 9.9 | 11.7 |

In FIG. 7, reference numerals 7 and 8 indicate the unit cell (i) and the unit cell (ii), respectively, whose compositions are shown in Table 2. These two unit cells were connected in series by a connector 9 and placed in a stainless battery container 10, the battery container being closed airtightly by a cover 12 with the aid of an insulating gasket 11. Battery assemblies S1–S4 were made in this way.

In Table 2 are shown the weights of the positive and negative electrodes, the amount of maximum extraction Q1 within the range where the insertion/extraction reactions of lithium ions into or from the lithium cobalt oxide are reversible in each unit cell, namely the quantity of electricity corresponding to the reaction of the formula (8), and the amount of lithium ion inserted Q2 until discontinuous change of potential of indium took place in the course of the insertion/extraction reaction of lithium ions into or from indium, namely the quantity of electricity corresponding to the reaction of the formula (3).

In the battery assembly S1, both of the unit cells (i) and (ii) are so composed that the lithium ion inserted Q2 until potential of the material showing discontinuous change of potential consequent to the lithium ion insertion/extraction reaction changes discontinuously will be smaller than the maximum amount of extraction Q2 of lithium ions in the reversible insertion/extraction of lithium ions into or from the lithium tansition metal oxide, which conforms to the conditions of the present invention for making a battery assembly. Also, in the battery assembly S2, the relation of Q1>Q2 holds in the unit cell (i) which is smaller in capacity than the other unit cell (ii). Thus, these batteries conform to the specified conditions of the present invention.

In the battery assembly S3, on the other hand, Q1<Q2 in the unit cell (ii) having the smaller capacity, and in the battery assembly S4, Q1<Q2 in both of the unit cells (i) and (ii), so that these battery assemblies do not meet the conditions of the present invention.

These battery assemblies were subjected to the following charge and discharge cycle test.

The battery assemblies were charged by applying a constant current of 250 $\mu$A. Set as the battery charge termination voltage was set to the voltage at which caused either (1) flow of a quantity of charged electricity corresponding to the reaction of letting the lithium cobalt oxide in the positive electrode of either of the unit cells has the composition of $Li_{0.5}CoO_2$ or (2) the charging curve changed discontinuously during charging.

The discharge current was 250 $\mu$A and the discharge termination voltage was 4.5 V.

In the charge and discharge cycle test conducted on these battery assemblies under the above charge and discharge conditions, the battery assemblies S1 and S2 showed substantially no change of charge and discharge behavior with the charge and discharge cycle, while the battery assemblies S3 and S4 showed a decrease in charge and discharge capacity with the charge and discharge cycle.

Then, influence of voltage drift during charging on the charge and discharge cycle behavior was examined in the following way.

For the charger, there was used a power source capable of generating a voltage equal to the combination of a voltage corresponding to the charge termination voltage decided in said constant-current charge and discharge cycle test and an AC voltage with an amplitude of 0.1 V and a frequency of 1 mHz. Each battery assembly was charged by this charger for 50 hours and then subjected to a charge and discharge cycle test in which each battery assembly was discharged down to 4.5 V with a constant current of 250 $\mu$A.

As a result, the battery assemblies S1 and S2 showed substantially no drop of discharge capacity with the charge and discharge cycle, while the battery assemblies S3 and S4 were small in discharge capacity from the beginning and showed a further drop of discharge capacity with the charge and discharge cycle.

It has thus been confirmed that a battery assembly with excellent charge and discharge cycle characteristics can be obtained according to the present invention.

Example 21

The influence of volumetric change of the electrode active material on the charge and discharge cycle characteristics was examined. In other examples, a solid-state secondary lithium battery was constituted by encapsulating the molded solid-state secondary lithium battery pellets in a coin battery case, but in the present example the solid-state secondary lithium battery pellets were encapsulated in a laminated film to constitute a battery and its properties were examined.

Using $Li_{4/3}Ti_{5/3}O_4$ as the negative electrode active material and $LiCoO_2$ as the positive electrode active material, there were molded the solid-state secondary lithium battery pellets same as those of the solid-state secondary lithium battery G of Example 15. A stainless steel-made mesh with steel-made lead wires spot welded to it was press bonded to each of the positive and negative electrodes of the molded solid-state secondary lithium battery pellets as current collectors and lead terminal. These were encapsulated in a film made by laminating a polyethylene sheet on a stainless foil to form a solid-state secondary lithium battery O.

Then, by way of comparison, the solid-state secondary lithium battery pellets same as those of the solid-state secondary lithium battery C of Example 2 were molded by using Al as negative electrode active material and $LiCoO_2$ as positive electrode active material, and a solid-state secondary lithium battery P was made therewith in the same way as in the case of the solid-state secondary lithium battery O.

These solid-state secondary lithium batteries were subjected to the same charge and discharge test as conducted on the battery G of Example 15 and the battery C of Example 2.

As a result, the solid-state secondary lithium battery O according to the present invention showed substantially no change in discharged quantity of electricity with the charge and discharge cycle, while the solid-state secondary lithium battery P made for comparison was small in discharge capacity from the beginning and showed a further drop of discharge capacity with the charge and discharge cycle.

The unsatisfactory properties of the comparative solid-state secondary lithium battery P may be accounted for by the fact that because the battery case was replaced by a laminated film, the pressure given from the case to the battery pellets contained in the case was reduced, making the battery composing elements more liable to become weakened in bonding therebetween with a volumetric change of the active material.

It has thus been confirmed that a solid-state secondary lithium battery with excellent charge and discharge cycle characteristics can be obtained according to the present invention.

In the foregoing Examples of the present invention, explanations were concentrated on the solid-state secondary lithium batteries made by using indium, aluminum, lead-indium alloy, lithium titanium oxide or titanium disulfide as the material showing discontinuous change of potential consequent to the insertion/extraction reaction of lithium ions into or from the lithium ion site in the crystal structure, but it goes without saying that the similar effect can be obtained when using other metals or alloys, transition metal oxides such as $MnO_2$, $WO_3$, $WO_2$ and $V_2O_5$, transition metal sulfides such as $MOS_2$, $NbS_2$ and $V_2S_4$, or composite oxides as said material. Thus, the present invention is not limited to the above-described embodiments using the mentioned substances as the material showing discontinuous change of potential consequent to the insertion/extraction reaction of lithium ions into or from the lithium ion site in the crystal structure.

Also, in the above Examples of the present invention, there were only shown the embodiments comprising the positive electrodes made by using lithium cobalt oxide, lithium nickel oxide and lithium manganese oxide as the lithium transition metal oxide which shows the reversible electrochemical insertion and extraction reactions of lithium ions into or from the lithium ion site in the crystal structure, but needless to say the similar effect can be obtained when using other lithium transition metal oxides such as lithium iron oxide, lithium nickel cobalt oxide, lithium nickel vanadium oxide, lithium manganese chromium oxide and the like. Thus, the present invention is not limited to the above-described embodiments comprising the positive electrodes made by using the mentioned compounds as the lithium transition metal oxide which shows the reversible electrochemical insertion and extraction reactions of lithium ions into or from the lithium ion site in the crystal structure.

Further, in the above Examples of the present invention, discussions were made with reference to the lithium ion conductive amorphous solid electrolytes of the compositions $0.01Li_3PO_4$-$0.63Li_2S$-$0.36SiS2$ and $0.05Li_2O$-$0.57Li_2S$-$0.38SiS2$, but needless to say, the similar effect can be obtained by using those of other compositions, those containing sulfides such as $Li_2S$—$GeS_2$, $Li_2S$—$P_2S_5$ and $Li_2S$—$B_2S_3$, those containing lithium halide such as LiCl—$Li_2S$—$SiS_2$ and LiBr—$Li_2S_2$—$P_2S_5$, those of the pseudo 4-component systems such as LiI—$Li_2S$—$SiS_2$—$P_2S_5$ and LiI—$Li_3PO_4$—$Li_2S$—$SiS_2$, oxide-based ones, and crystalline lithium ion conductive inorganic solid electrolytes such as $Li_3N$, $Li_{1.3}Sc_{0.3}Ti_{1.7}(PO_4)_3$ and $Li_{0.2}La_{0.5}TiO_3$. Thus, the lithium ion conductive inorganic solid electrolyes in the conception of the present invention are not limited to those described in the Examples.

Also, the above Examples of the present invention merely describe a solid-state secondary lithium battery assembly construction consisting of two series-connected unit cells housed in a battery container, but obviously the similar effect can be obtained by employing a battery system consisting of more than two unit cells connected to each other, a system in which the unit cells are partly connected in parallel, a system in which the solid-state secondary lithium batteries housed in the plural containers are connected in series or parallel, a system in which the solid-state secondary lithium batteries are connected to the secondary lithium batteries using an organic solvent electrolyte, and a system in which the solid-state secondary lithium batteries are connected to other secondary batteries such as nickel-cadminum batteries.

According to the present invention, as described above, a solid-state secondary lithium battery with excellent charge and discharge cycle characteristics can be obtained by incorporating a structure in which the amount of lithium ion inserted to the negative electrode until its potential showing discontinuous change of potential consequent to the lithium ion insertion/extraction reaction changes discontinuously is equal to or smaller than the maximum amount of extraction of lithium ions within the range where insertion/extraction of lithium ions into or from the lithium transition metal oxide is reversible.

Also, according to the present invention, a battery assembly with excellent charge and discharge cycle characteristics can be obtained by using said solid-state secondary lithium battery at least as one unit cell having the smallest capacity.

Further, according to the present invention, it is possible to better the charge and discharge cycle characteristics of the solid-state secondary lithium batteries by charging the batteries, which show discontinuous change of voltage from V1 to V2 with relation to the charged quantity of electricity, at a voltage below V2.

What is claimed is:

1. A method for charging, a solid-state lithium battery comprising an electrolyte layer comprising mainly a lithium ion conductive solid electrolyte, a positive electrode comprising a lithium transition metal oxide capable of inducing reversible electrochemical insertion and extraction reactions of lithium ions into or from lithium ion sites in a crystal structure, and a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, said method comprising the step of:

charging the battery showing discontinuous change of voltage from the voltage $V_1$ to the voltage $V_2$ relative to a charged quantity of electricity, at a voltage same as or less than the voltage $V_2$.

2. A method for charging a battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the material showing discontinuous change of potential consequent to the insertion and extraction reactions to lithium ions into or from the lithium ion sites in the crystal structure is at least one metal selected from the group consisting of indium, aluminum, lead, bismuth, antimony, gallium, tin, silver, silicon, zinc, cadmium, arsenic and titanium, an alloy of the metals selected from the above group, or an alloy of lithium and at least one metal selected from the above group, said method comprising the step of:

charging the battery showing discontinuous change of voltage from the voltage $V_1$ to the voltage $V_2$ relative to a charged quantity of electricity, at a voltage same as or less than the voltage $V_2$.

3. A method for charging a battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the material showing discontinuous change of potential consequent to the insertion and extraction reactions of lithium ions into or from the lithium ion sites in the crystal structure is indium, and the amount of the lithium ion inserted, until potential of the material showing discontinuous change of potential consequent to the insertion and extraction reactions of lithium ions discontinuously changes, is the amount corresponding to the following reaction formula (1):

$$\text{In} + \text{Li}^+ + e^- \rightarrow \text{In—Li} \tag{1},$$

said method comprising the step of:

charging the battery showing discontinuous change of voltage from the voltage $V_1$ to the voltage $V_2$ relative to a charged quantity of electricity, at a voltage same as or less than the voltage $V_2$.

4. A method for charging a battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, wherein the material showing discontinuous change of potential consequent to the insertion and extraction reactions of lithium ions into or from the lithium ion sites in the crystal structure is aluminum, and the amount of the lithium ion inserted, until potential of the material showing discontinuous change of potential consequent to the insertion and extraction reactions, of lithium ions discontinuously changes, is the amount corresponding to the following reaction formula (2):

$$\text{Al} + \text{Li}^+ + e^- \rightarrow \text{Al—Li} \tag{2},$$

said method comprising the step of:

charging the battery showing discontinuous change of voltage from the voltage $V_1$ to the voltage $V_2$ relative to a charged quantity of electricity, at a voltage same as or less than the voltage $V_2$.

5. A method for charging a battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the material showing discontinuous change of potential consequent to the insertion and extraction reactions of lithium ions into or from the lithium ion sites in the crystal structure is selected from the group consisting of transition metal oxides, lithium transition metal oxides, transition metal sulfides and lithium transition metal sulfides, said method comprising the step of:

charging the battery showing discontinuous change of voltage from the voltage $V_1$ to the voltage $V_2$ relative to a charged quantity of electricity, at a voltage same as or less than the voltage $V_2$.

6. A method for charging a battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the material showing discontinuous change of potential consequent to the insertion and extraction reactions of lithium ions into or from the lithium ion sites in the crystal structure is selected from the group consisting of transition metal oxides, lithium transition metal oxides, transition metal sulfides and lithium transition metal sulfides, wherein the transition metal element of the transition metal oxides or lithium transition metal oxides is at least one element selected from the group consisting of titanium, manganese, tungsten and vanadium, said method comprising the step of:

charging the battery showing discontinuous change of voltage from the voltage $V_1$ to the voltage $V_2$ relative to a charged quantity of electricity, at a voltage same as or less than the voltage $V_2$.

7. A method for charging a battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the material showing discontinuous change of potential consequent to the insertion and extraction reactions of lithium ions into or from the lithium ion sites in the crystal structure is selected from the group consisting of transition metal oxides, lithium transition metal oxides, transition metal sulfides and lithium transition metal sulfides, wherein the transition metal element of the transition metal sulfides or lithium transition metal sulfides is at least one element selected from the group consisting of titanium, molybdenum, niobium, tungsten and vanadium, said method comprising the step of:

charging the battery showing discontinuous change of voltage from the voltage $V_1$ to the voltage $V_2$ relative to a charged quantity of electricity, at a voltage same as or less than the voltage $V_2$.

8. A method for charging a battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the transition metal element of the lithium transition metal oxides is at least one element from the group consisting of cobalt, manganese and iron, said method comprising the step of:

charging the battery showing discontinuous change of voltage from the voltage $V_1$ to the voltage $V_2$ relative to a charged quantity of electricity, at a voltage same as or less than the voltage $V_2$.

9. A method for charging a battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the lithium ion conductive solid electrolyte is an inorganic compound, said method comprising the step of:

charging the battery showing discontinuous change of voltage from the voltage $V_1$ to the voltage $V_2$ relative to a charged quantity of electricity, at a voltage same as or less than the voltage $V_2$.

10. A method for charging a battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, wherein the lithium ion conductive solid electrolyte is an inorganic compound, and wherein the inorganic compound is an amorphous compound comprising mainly a sulfide, said method comprising the step of:

charging the battery showing discontinuous change of voltage from the voltage $V_1$ to the voltage $V_2$ relative to a charged quantity of electricity, at a voltage same as or less than the voltage $V_2$.

11. A method for charging a battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, wherein the lithium ion conductive solid electrolyte is an inorganic compound, and wherein the inorganic compound is synthesized from a material comprising mainly lithium sulfide and silicon sulfide, said method comprising the step of:

charging the battery showing discontinuous change of voltage from the voltage $V_1$ to the voltage $V_2$ relative to a charged quantity of electricity, at a voltage same as or less than the voltage $V_2$.

12. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, said method comprising the step of:

charging the battery assembly showing discontinuous change of voltage from the voltage $V_1$ to the voltage $V_2$ relative to a charged quantity of electricity, at a voltage same as or less than the voltage $V_2$.

13. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, wherein the plural unit cells are housed in a single airtight battery container, said method comprising the step of:

charging the battery assembly showing discontinuous change of voltage from the voltage $V_1$ to the voltage $V_2$ relative to a charged quantity of electricity, at a voltage same as or less than the voltage $V_2$.

14. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the material showing discontinuous change of potential consequent to the insertion and extraction reactions to lithium ions into or from the lithium ion sites in the crystal structure is at least one metal selected from the group consisting of indium, aluminum, lead, bismuth, antimony, gallium, tin, silver, silicon, zinc, cadmium, arsenic and titanium, an alloy of the metals selected from the above group, or an alloy of lithium and at least one metal selected from the above group, said method comprising the step of:

charging the battery assembly showing discontinuous change of voltage from the voltage $V_1$ to the voltage $V_2$ relative to a charged quantity of electricity, at a voltage same as or less than the voltage $V_2$.

15. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the material showing discontinuous change of potential consequent to the insertion and extraction reactions of lithium ions into or from the lithium ion sites in the crystal structure is indium, and the amount of the lithium ion inserted, until potential of the material showing discontinuous change of potential consequent to the insertion and extraction reactions of lithium ions discontinuously changes, is the amount corresponding to the following reaction formula (1):

$$\text{In} + \text{Li}^+ + e^- \rightarrow \text{In—Li} \qquad (1),$$

said method comprising the step of:

charging the battery assembly showing discontinuous change of voltage from the voltage $V_1$ to the voltage $V_2$ relative to a charged quantity of electricity, at a voltage same as or less than the voltage $V_2$.

16. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, wherein the material showing discontinuous change of potential consequent to the insertion and extraction reactions of lithium ions into or from the lithium ion sites in the crystal structure is aluminum, and the amount of the lithium ion inserted, until potential of the material showing discontinuous change of potential consequent to the insertion and extraction reactions of lithium ions discontinuously changes, is the amount corresponding to the following reaction formula (2):

$$\text{Al} + \text{Li}^+ + e^- \rightarrow \text{Al—Li} \qquad (2),$$

said method comprising the step of:

charging the battery assembly showing discontinuous change of voltage from the voltage $V_1$ to the voltage $V_2$ relative to a charged quantity of electricity, at a voltage same as or less than the voltage $V_2$.

17. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the material showing discontinuous change of potential consequent to the insertion and extraction reactions of lithium ions into or from the lithium ion sites in the crystal structure is selected from the group consisting of transition metal oxides, lithium transition metal oxides, transition metal sulfides and lithium transition metal sulfides, said method comprising the step of:

charging the battery assembly showing discontinuous change of voltage from the voltage $V_1$ to the voltage $V_2$ relative to a charged quantity of electricity, at a voltage same as or less than the voltage $V_2$.

18. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium, ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, wherein the material showing discontinuous change of potential consequent to the insertion and extraction reactions of lithium ions into or from the lithium ion sites in the crystal structure is selected from the group consisting of transition metal oxides, lithium transition metal oxides, transition metal sulfides and lithium transition metal sulfides, wherein the transition metal element of the transition metal oxides or lithium transition metal oxides is at least one element selected from the group consisting of titanium, manganese, tungsten and vanadium, said method comprising the step of:

charging the battery assembly showing discontinuous change of voltage from the voltage $V_1$ to the voltage $V_2$ relative to a charged quantity of electricity, at a voltage same as or less than the voltage $V_2$.

19. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, wherein the material showing discontinuous change of potential consequent to the insertion and extraction reactions of lithium ions into or from the lithium ion sites in the crystal structure is selected from the group consisting of transition metal oxides, lithium transition metal oxides, transition metal sulfides and lithium transition metal sulfides, wherein the transition metal element of the transition metal sulfides or lithium transition metal sulfides is at least one element selected from the group consisting of titanium, molybdenum, niobium, tungsten and vanadium, said method comprising the step of:

charging the battery assembly showing discontinuous change of voltage from the voltage $V_1$ to the voltage $V_2$ relative to a charged quantity of electricity, at a voltage same as or less than the voltage $V_2$.

20. A method for charging battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the transition metal element of the lithium transition metal oxides is at least one element selected from the group consisting of cobalt, nickel, manganese and iron, said method comprising the step of:

charging the battery assembly showing discontinuous change of voltage from the voltage $V_1$ to the voltage $V_2$ relative to a charged quantity of electricity, at a voltage same as or less than the voltage $V_2$.

21. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the lithium ion conductive solid electrolyte is an inorganic compound, said method comprising the step of:

charging the battery assembly showing discontinuous change of voltage from the voltage $V_1$ to the voltage $V_2$ relative to a charged quantity of electricity, at a voltage same as or less than the voltage $V_2$.

22. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, wherein the lithium ion conductive solid electrolyte is an inorganic compound, and wherein the inorganic compound is an amorphous compound comprising mainly a sulfide, said method comprising the step of:
charging the battery assembly showing discontinuous change of voltage from the voltage $V_1$ to the voltage $V_2$ relative to a charged quantity of electricity, at a voltage same as or less than the voltage $V_2$.

23. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure,
wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide,
wherein the lithium ion conductive solid electrolyte is an inorganic compound, and
wherein the inorganic compound is synthesized from a material comprising mainly lithium sulfide and silicon sulfide, said method comprising the step of:
charging the battery assembly showing discontinuous change of voltage from the voltage $V_1$ to the voltage $V_2$ relative to a charged quantity of electricity, at a voltage same as or less than the voltage $V_2$.

24. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure,
wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and
wherein the material showing discontinuous change of potential consequent to the insertion and extraction reactions to lithium ions into or from the lithium ion sites in the crystal structure is at least one metal selected from the group consisting of indium, aluminum, lead, bismuth, antimony, gallium, tin, silver, silicon, zinc, cadmium, arsenic and titanium, an alloy of the metals selected from the above group, or an alloy of lithium and at least one metal selected from the above group, wherein the plural unit cells are housed in a single airtight battery container, said method comprising the step of:
charging the battery assembly showing discontinuous change of voltage from the voltage $V_1$ to the voltage $V_2$ relative to a charged quantity of electricity, at a voltage same as or less than the voltage $V_2$.

25. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure,
wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and
wherein the material showing discontinuous change of potential consequent to the insertion and extraction reactions of lithium ions into or from the lithium ion sites in the crystal structure is indium, and the amount of the lithium ion inserted, until potential of the material showing discontinuous change of potential consequent to the insertion and extraction reactions of lithium ions discontinuously changes, is the amount corresponding to the following reaction formula (1):

$$In + Li^+ + e^- \rightarrow In\text{---}Li \qquad (1),$$

wherein the plural unit cells are housed in a single airtight battery container, said method comprising the step of:
charging the battery assembly showing discontinuous change of voltage from the voltage $V_1$ to the voltage $V_2$ relative to a charged quantity of electricity, at a voltage same as or less than the voltage $V_2$.

26. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, wherein the material showing discontinuous change of potential consequent to the insertion and extraction reactions of lithium ions into or from the lithium ion sites in the crystal structure is aluminum, and the amount of the lithium ion inserted, until potential of the material showing discontinuous change of potential consequent to the insertion and extraction reactions of lithium ions discontinuously changes, is the amount corresponding to the following reaction formula (2):

$$Al + Li^+ + e^- \rightarrow Al\text{—}Li \quad (2),$$

wherein the plural unit cells are housed in a single airtight battery container, said method, comprising the step of:
charging the battery assembly showing discontinuous change of voltage from the voltage $V_1$ to the voltage $V_2$ relative to a charged quantity of electricity, at a voltage same as or less than the voltage $V_2$.

27. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the material showing discontinuous change of potential consequent to the insertion and extraction reactions of lithium ions into or from the lithium ion sites in the crystal structure is selected from the group consisting of transition metal oxides, lithium transition metal oxides, transition metal sulfides and lithium transition metal sulfides, wherein the plural unit cells are housed in a single airtight battery container, said method comprising the step of:
charging the battery assembly showing discontinuous change of voltage from the voltage $V_1$ to the voltage $V_2$ relative to a charged quantity of electricity, at a voltage same as or less than the voltage $V_2$.

28. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the material showing discontinuous change of potential consequent to the insertion and extraction reactions of lithium ions into or from the lithium ion sites in the crystal structure is selected from the group consisting of transition metal oxides, lithium transition metal oxides, transition metal sulfides and lithium transition metal sulfides, wherein the transition metal element of the transition metal oxides or lithium transition metal oxides is at least one element selected from the group consisting of titanium, manganese, tungsten and vanadium, wherein the plural unit cells are housed in a single airtight battery container, said method comprising the step of:
charging the battery assembly showing discontinuous change of voltage from the voltage $V_1$ to the voltage $V_2$ relative to a charged quantity of electricity, at a voltage same as or less than the voltage $V_2$.

29. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the material showing discontinuous change of potential consequent to the insertion and extraction reactions of lithium ions into or from the lithium ion sites in the crystal structure is selected from the group consisting of transition metal oxides, lithium transition metal oxides, transition metal sulfides and lithium transition metal sulfides, wherein the transition metal element of the transition metal sulfides or lithium transition metal sulfides is at least one element selected from the group consisting of titanium, molybdenum, niobium, tungsten and vanadium, wherein the plural unit cells are housed in a single airtight battery container, said method comprising the step of:

charging the battery assembly showing discontinuous change of voltage from the voltage $V_1$ to the voltage $V_2$ relative to a charged quantity of electricity, at a voltage same as or less than the voltage $V_2$.

30. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the transition metal element of the lithium transition metal oxides is at least one element from the group consisting of cobalt, nickel, manganese and iron, wherein the plural unit cells are housed in a single airtight battery container, said method comprising the step of:

charging the battery assembly showing discontinuous change of voltage from the voltage $V_1$ to the voltage $V_2$ relative to a charged quantity of electricity, at a voltage same as or less than the voltage $V_2$.

31. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, and wherein the lithium ion conductive solid electrolyte is an inorganic compound, wherein the plural unit cells are housed in a single airtight battery container, said method comprising the step of:

charging the battery assembly showing discontinuous change of voltage from the voltage $V_1$ to the voltage $V_2$ relative to a charged quantity of electricity, at a voltage same as or less than the voltage $V_2$.

32. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, wherein the lithium ion conductive solid electrolyte is an inorganic compound, and wherein the inorganic compound is an amorphous compound comprising mainly a sulfide, wherein the plural unit cells are housed in a single airtight battery container, said method comprising the step of:

charging the battery assembly showing discontinuous change of voltage from the voltage $V_1$ to the voltage $V_2$ relative to a charged quantity of electricity, at a voltage same as or less than the voltage $V_2$.

33. A method for charging a battery assembly comprising plural electrically connected unit cells, which battery assembly has a structure of plural unit cells connected in series at a part of the battery assembly and a unit cell having at least the smallest capacity among the plural unit cells connected in series is a solid-state secondary lithium battery comprising (a) an electrolyte layer comprising mainly a lithium ion conductive solid electrolyte, (b) a positive electrode comprising a lithium transition metal oxide capable of inducing reversible electrochemical insertion and extraction reactions of lithium ions into or from lithium ion sites in a crystal structure, and (c) a negative electrode comprising a material showing discontinuous change of potential consequent to insertion and extraction reactions of lithium ions into or from the lithium ion sites in the crystal structure, wherein an amount of the lithium ion inserted, until a potential of the material showing discontinuous change of potential consequent to the insertion and extraction reactions of lithium ions discontinuously changes, is equal to or less than a maximum amount of an extracted amount of the lithium ions which is extracted by the reversible insertion and extraction reactions of the lithium transition metal oxide, wherein the lithium ion conductive solid electrolyte is an inorganic compound, and wherein the inorganic compound is synthesized from a material comprising mainly lithium sulfide and silicon sulfide, wherein the plural unit cells are housed in a single airtight battery container, said method comprising the step of:

charging the battery assembly showing discontinuous change of voltage from the voltage $V_1$ to the voltage $V_2$ relative to a charged quantity of electricity, at a voltage same as or less than the voltage $V_2$.

* * * * *